(12) United States Patent
Li et al.

(10) Patent No.: US 11,537,265 B2
(45) Date of Patent: Dec. 27, 2022

(54) METHOD AND APPARATUS FOR DISPLAYING OBJECT

(71) Applicant: Beijing Xiaomi Mobile Software Co., Ltd., Beijing (CN)

(72) Inventors: Lan Li, Beijing (CN); Jiayan Li, Beijing (CN); Zhenzhou Lu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 50 days.

(21) Appl. No.: 16/123,702

(22) Filed: Sep. 6, 2018

(65) Prior Publication Data

US 2019/0073096 A1    Mar. 7, 2019

(30) Foreign Application Priority Data

Sep. 7, 2017    (CN) .......................... 201710802328.9

(51) Int. Cl.
*G06F 3/0482* (2013.01)
*G06F 3/0485* (2022.01)
(Continued)

(52) U.S. Cl.
CPC .......... *G06F 3/0482* (2013.01); *G06F 3/0483* (2013.01); *G06F 3/0485* (2013.01);
(Continued)

(58) Field of Classification Search
CPC .. G06F 3/0482; G06F 3/0483; G06F 3/04845; G06F 3/0485; G06F 3/04855; G06F 16/00; G06F 16/16; G06F 16/168
(Continued)

(56) References Cited

U.S. PATENT DOCUMENTS 5,307,086 A * 4/1994 Griffin .................. G06F 3/0481
345/636
6,966,033 B1 * 11/2005 Gasser .................... H04L 41/22
715/738

(Continued)

FOREIGN PATENT DOCUMENTS

CN    102779006 A    11/2012
CN    104866179 A    8/2015
(Continued)

OTHER PUBLICATIONS

Extended European Search Report dated Jan. 25, 2019 in Patent Application No. 18192021.6, 15 pages.
(Continued)

*Primary Examiner* — Reza Nabi
*Assistant Examiner* — Hwei-Min Lu
(74) *Attorney, Agent, or Firm* — Oblon, McClelland, Maier & Neustadt, L.L.P.

(57) ABSTRACT

The present disclosure relates to a method and an apparatus for displaying an object. The method includes displaying a navigation bar and a user interface of an application program, wherein the navigation bar is configured to display widgets of n virtual buttons provided by an operating system, where n is a positive integer; when a first object is displayed in the user interface, determining a second object corresponding to the first object, wherein the first object and the second object are a part of a superior-level object; displaying in the navigation bar a display widget corresponding to the second object; receiving a first signal that is generated based on a first specified operation that is triggered on the display widget; and switching a display of the first object in the user interface to a display of the second object.

18 Claims, 17 Drawing Sheets

(51) Int. Cl.
  *G06F 3/04842* (2022.01)
  *G06F 3/04855* (2022.01)
  *G06F 16/00* (2019.01)
  *G06F 3/0483* (2013.01)
  *G06F 3/04845* (2022.01)

(52) U.S. Cl.
  CPC ...... *G06F 3/04842* (2013.01); *G06F 3/04845* (2013.01); *G06F 3/04855* (2013.01); *G06F 16/00* (2019.01)

(58) Field of Classification Search
  USPC .................................. 715/779, 764, 766, 778
  See application file for complete search history.

(56) References Cited

U.S. PATENT DOCUMENTS

| | | | | |
|---|---|---|---|---|
| 8,375,072 | B1* | 2/2013 | Burgess | G06F 16/93 707/804 |
| 10,503,398 | B2* | 12/2019 | Leyon | G06F 3/021 |
| 2004/0056903 | A1* | 3/2004 | Sakai | G06F 16/168 707/E17.01 |
| 2004/0085367 | A1* | 5/2004 | Hagarty, Jr. | G06F 9/451 715/854 |
| 2005/0246368 | A1* | 11/2005 | Yeung | G06F 16/289 707/999.102 |
| 2006/0036568 | A1* | 2/2006 | Moore | G06F 16/168 |
| 2006/0206829 | A1 | 9/2006 | Komamura et al. | |
| 2007/0247394 | A1* | 10/2007 | Boyan | G06F 3/0482 345/23 |
| 2010/0269039 | A1 | 10/2010 | Pahlavan et al. | |
| 2011/0231790 | A1* | 9/2011 | Forstall | G06F 3/0482 715/779 |
| 2012/0068935 | A1* | 3/2012 | Mutoh | H04N 1/4433 345/168 |
| 2012/0210200 | A1* | 8/2012 | Berger | G06F 3/04845 715/202 |
| 2012/0266069 | A1* | 10/2012 | Moshiri | H04N 21/4782 715/773 |
| 2012/0290441 | A1* | 11/2012 | Mahaniok | G06F 16/24 705/26.62 |
| 2014/0026098 | A1* | 1/2014 | Gilman | G06F 3/04883 715/810 |
| 2014/0189585 | A1* | 7/2014 | Brush | B60R 16/023 715/808 |
| 2014/0359518 | A1* | 12/2014 | Wu | G06F 3/04817 715/779 |
| 2015/0082240 | A1* | 3/2015 | Ording | G06F 3/0485 715/815 |
| 2015/0177933 | A1 | 6/2015 | Cueto | |
| 2015/0334291 | A1* | 11/2015 | Cho | G06F 3/04845 348/222.1 |
| 2015/0378535 | A1* | 12/2015 | Habib | G06F 1/1643 715/776 |
| 2016/0117744 | A1* | 4/2016 | Oayda | G06Q 30/016 705/26.43 |
| 2016/0147440 | A1 | 5/2016 | Leyon | |
| 2017/0010771 | A1* | 1/2017 | Bernstein | G06F 3/0412 |

FOREIGN PATENT DOCUMENTS

| | | |
|---|---|---|
| CN | 105426083 A | 3/2016 |
| CN | 105718148 A | 6/2016 |
| CN | 106896982 A | 6/2017 |

OTHER PUBLICATIONS

Combined Chinese Office Action and Search Report dated Mar. 19, 2020, in Patent Application No. 201710802328.9, 10 pages (with English Translation of Category of Cited Documents).

Office Action dated Nov. 9, 2020 in corresponding European Patent Application No. 18 192 021.6, 10 pages.

Combined Office Action and Search Report dated Mar. 17, 2021, in Chinese Patent Application No. 201710802328.9 (with English-language translation).

* cited by examiner

METHOD AND APPARATUS FOR DISPLAYING OBJECT

CROSS-REFERENCE TO RELATED APPLICATIONS

The present application is based upon and claims priority to Chinese Patent Application No. 201710802328.9, filed on Sep. 7, 2017, the entire contents of which are incorporated herein by reference.

TECHNICAL FIELD

The present disclosure relates to the field of computer technologies, and in particular, to a method and an apparatus for displaying an object.

BACKGROUND

A navigation bar is a bar area with virtual buttons at the bottom of the screen of a terminal. The virtual buttons in the navigation bar provide at least one of the functions of returning to the superior level, returning to the home screen, and multi-task management.

In case that a terminal displays an object, if it is required to switch from the currently displayed object to another object at the same level as that object, the terminal needs the user to first click the virtual function button of returning to the superior level in the navigation bar and then click the object to switch to and display in the superior level list. For example, if there are file A and file B in a folder, in case that the terminal displays file A on the screen, the user needs to click the virtual function button of returning to the superior level to trigger the terminal to display the folder containing the icon of file A and the icon of file B, and then the user clicks file B in this folder to complete the operation of switching from the state of displaying file A to the state of displaying file B.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying an object. The method includes displaying a navigation bar and a user interface of an application program, wherein the navigation bar is configured to display widgets of n virtual buttons provided by an operating system, where n is a positive integer; when a first object is displayed in the user interface, determining a second object corresponding to the first object, wherein the first object and the second object are a part of a superior-level object; displaying in the navigation bar a display widget corresponding to the second object; receiving a first signal that is generated based on a first specified operation that is triggered on the display widget; and switching a display of the first object in the user interface to a display of the second object.

In an example, the second object is a folder including at least one sub-object, and when displaying in the navigation bar the display widget corresponding to the second object, the method includes, when the at least one sub-object is at least one folder, displaying, in the navigation bar, a respective display widget corresponding to each subordinate file and/or subordinate folder included in each of the folders.

In another example, the second object is a folder including at least one sub-object, and when displaying in the navigation bar the display widget corresponding to the second object, the method includes, when the at least one sub-object is at least one file, displaying, in the navigation bar, a respective display widget corresponding to each of the files.

In yet another example, the second object is a folder including at least one sub-object, and when displaying in the navigation bar the display widget corresponding to the second object, the method includes, when the at least one sub-object includes at least one file and at least one folder, displaying, in the navigation bar, a respective display widget corresponding to each of the files or the folders.

According to an aspect, the second object is at least two objects, and when displaying in the navigation bar the display widget corresponding to the second object, the method includes displaying an integration portal in the navigation bar; receiving a second signal that is generated based on a second specified operation that is triggered on the integration portal; and displaying in the navigation bar, based on the second signal, a respective display widget corresponding to each of the at least two second objects.

In an example, when displaying the integration portal in the navigation bar, the method includes, when the second object exists in the user interface, additionally displaying the integration portal on the area of the navigation bar except n virtual buttons, the n virtual buttons comprising at least one of a return button, a home button, and a menu button. Furthermore, when displaying in the navigation bar, based on the second signal, the respective display widget corresponding to each of the at least two second objects, the method includes, based on the second signal, replacing a display of a predetermined virtual button among the n virtual buttons with a display of the at least two display widgets.

According to an aspect, the method further includes displaying a navigation menu button in the navigation bar; receiving a third signal that is generated based on a third specified operation that is triggered on the navigation menu button; and based on the third signal, resuming the display of the predetermined virtual button to replace the display of the at least two display widgets.

In an example, when displaying in the navigation bar the display widget corresponding to the second object, the method includes, when the display widget comprises M widgets, determining N first display widgets and M-N second display widgets among the M widgets, wherein N is a preset positive integer and M is an integer greater than N; displaying the N first display widgets in the navigation bar; and when a fourth specified operation performed on the navigation bar is detected, replacing a display of Z display widgets among the N first display widgets with a display of Z display widgets among the M-N second display widgets, wherein Z is a positive integer and Z is not greater than a smaller one of N and M-N.

According to an aspect, at least one of a thumbnail of the second object and thumbnail text information corresponding to the second object is displayed in the display widget.

In an example, the first specified operation performed on the display widget includes a click operation or a long-time press operation on the display widget; or moving the display widget to a specified position in the navigation bar.

Aspects of the disclosure also provide an apparatus for displaying an object. The apparatus includes a processor and a memory configured to store processor-executable instructions. The processor is configured to display a navigation bar and a user interface of an application program, wherein the navigation bar is configured to display widgets of n virtual buttons provided by an operating system, where n is a positive integer; when a first object is displayed in the user interface, determine a second object corresponding to the first object, wherein the first object and the second object are a part of a superior-level object; display in the navigation bar a display widget corresponding to the second object; receive a first signal that is generated based on a first specified operation that is triggered on the display widget; and switch a display of the first object in the user interface to a display of the second object.

Aspects of the disclosure also provide a non-transitory computer-readable medium storing instructions that, when executed by one or more processors of a computing device, cause the computing device to display a navigation bar and a user interface of an application program, wherein the navigation bar is configured to display widgets of n virtual buttons provided by an operating system, where n is a positive integer; when a first object is displayed in the user interface, determine a second object corresponding to the first object, wherein the first object and the second object are a part of a superior-level object; display in the navigation bar a display widget corresponding to the second object; receive a first signal that is generated based on a first specified operation that is triggered on the display widget; and switch a display of the first object in the user interface to a display of the second object.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this description, illustrate aspects consistent with the present disclosure and, and together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The "module" as referred to herein refers to a program or instructions stored in a memory capable of implementing certain functions; the "plurality" as referred to herein means two or more. The "and/or" describing the relationship between associated objects represents that there may exist three relationships, for example, A and/or B, may represent three cases: A exists alone, both A and B exist, and B exists alone. The character "/" generally represents that the preceding and following associated objects have an "or" relationship.

In the aspects of the present disclosure, the method of illustrating a display widget may be applied to a terminal comprising a smart phone, a tablet, an e-book reader, a Moving Picture Experts Group Audio Layer III (MP3) player, a Moving Picture Experts Group Audio Layer IV (MP4) player, a laptop portable computer, a personal computer (PC) and the like. Alternatively, an operating system providing a navigation bar runs in the terminal. The operating system comprises but is not limited to an Android system or a customized system developed based on the Android system.

Figure 1:
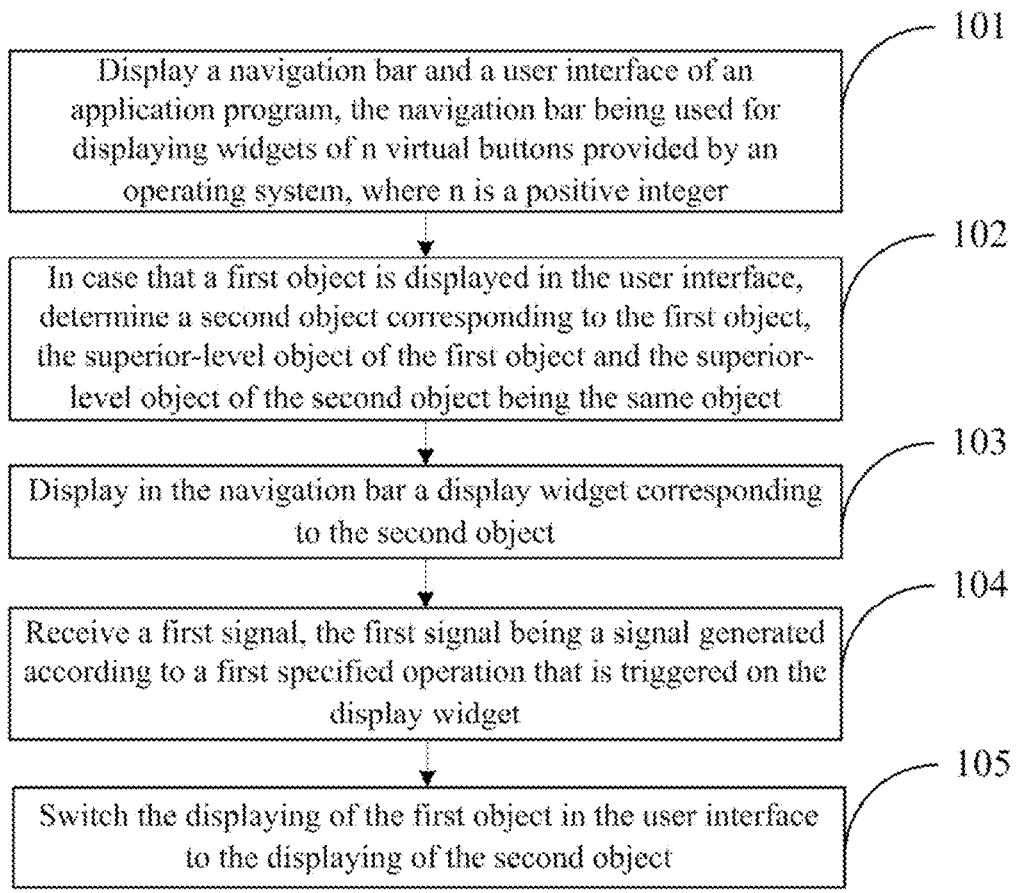
FIG. 1 is a flowchart of a method for displaying an object provided by an exemplary aspect of the present disclosure.

Please refer to FIG. 1, which is a flowchart of a method for displaying an object provided by an aspect of the present disclosure. The method may be used in the foregoing terminal. As shown in FIG. 1, the method for displaying an object may comprise:

In step 101, a navigation bar and a user interface of an application program are displayed, the navigation bar being used for displaying widgets of n virtual buttons provided by an operating system, where n is a positive integer.

In the aspect of the present disclosure, the navigation bar is an area provided by the operating system presented in the form of a bar. In this area, virtual buttons provided by the operating system are displayed, and different virtual buttons when triggered are capable of implementing different system functions. For example, the virtual buttons comprise a return button, a home button, and a menu button, wherein the return button is used for implementing the function of returning to the superior level, the home button is used for implementing the function of switching to the home page, and the menu button is used for implementing the function of opening the menu of the currently running application program.

In the present disclosure, the number of virtual buttons displayed in the navigation bar is a positive integer. In addition, due to the limited size of the screen of the terminal, generally speaking for different terminals, the number of virtual buttons that can be displayed in the screen at the same time has an upper limit. For example, the navigation bar of a terminal displays widgets with n virtual buttons, where n is a positive integer, n can be a minimum of 1, and as the length of the bottom border of the terminal is limited, the upper limit of n can be 5.

Alternatively, the maximum value of the width of the navigation bar has an upper limit due to the limitation of the width of the screen, and the height of the navigation bar can be adjusted within a certain range, so that the navigation bar can display widgets of at least two rows of virtual buttons. The specific display style of the navigation bar is not limited in the aspect.

In the aspect of the present disclosure, the operating system displays the navigation bar and the user interface of the application program in parallel, so that the user can see the content displayed in the navigation bar while seeing the complete user interface. Alternatively, the operating system may also place the navigation bar on the upper layer of the bottom of the user interface for display, and when the navigation bar is displayed on the upper layer of the bottom of the user interface, the navigation bar may be translucently displayed.

In step 102, when a first object is displayed in the user interface, a second object corresponding to the first object is determined, and the superior-level object of the first object and the superior-level object of the second object are the same object.

In the aspect of the present disclosure, the objects (comprising the first object and the second object described above) may be files or folders in a target application program that can be processed by the operating system. Alternatively, the object may comprise at least one of a document file, a picture, a menology (calendar) page and a webpage, under the condition that it can be processed by the operating system.

The first object and the second object belong to the same superior-level object, that is, the first object and the second object have the same affiliation. For example, if folder A as the superior-level object comprises file B and file C, when the file currently displayed on the terminal is the file B (the first object), as both the superior-level objects corresponding to the file B and the file C are the folder A, then the operating system in the terminal can determine that the file C is the second object relative to the file B. For another example, the superior-level object is the year calendar of 2017, which contains monthly calendars of 12 months, and if the monthly calendar of one month therein is used as the first object, the monthly calendars of the remaining 11 months are used as the second object of the monthly calendar corresponding to the first object. For another example, the superior-level object is a photo album containing 10 photos, and if one of the photos is used as the first object, the other 9 photos are the second objects corresponding to the photo being used as the first object.

In step 103, a display widget corresponding to the second object is displayed in the navigation bar.

In the aspect of the present disclosure, a display widget of the second object is used to display the second object. When the display widget of the second object is triggered, the terminal displays the second object. Wherein, the display widget may be a thumbnail of the second object or thumbnail text information corresponding to the second object.

Figure 2A:
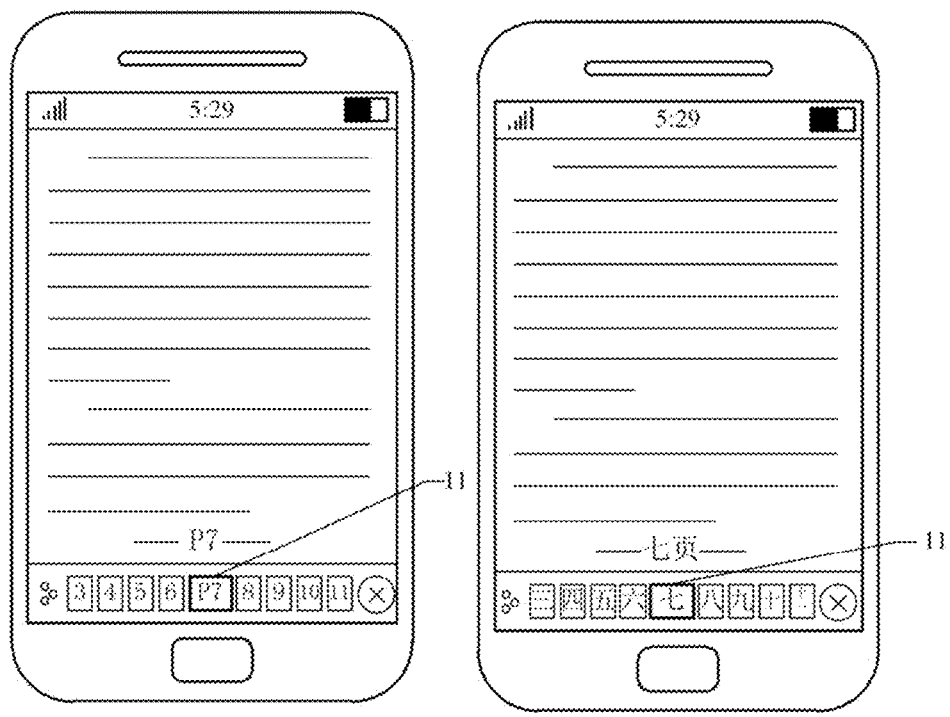
FIG. 2A is a schematic diagram of a display widget provided based on the method for displaying an object shown in FIG. 1.
Figure 2B:
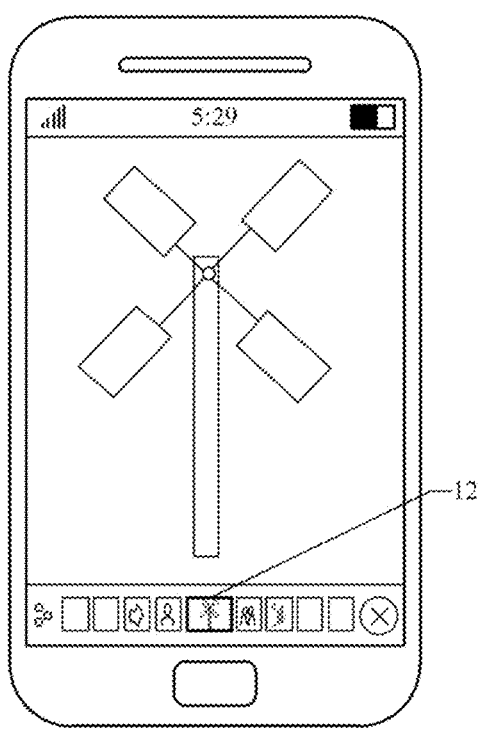
FIG. 2B is a schematic diagram of another display widget provided based on the method for displaying an object shown in FIG. 1.

For example, referring to FIG. 2A, which is a schematic diagram of a display widget provided based on the method for displaying an object shown in FIG. 1, when a second object is the seventh page of a document file, the display widget 11 of the second object may be a page mark "P7" or a Chinese character "七 (seven)." For another example, referring to FIG. 2B, which is a schematic diagram of another display widget provided based on the method for displaying an object shown in FIG. 1, when the second object is a picture, the display widget 12 may be a thumbnail of the picture In step 104, a first signal is received, the first signal being a signal generated according to a first specified operation that is triggered on the display widget.

The terminal can accept the first specified operation for the display widget. Wherein, the first specified operation may be a click operation (a short-time press touch), a long-time press operation, swiping to the left, swiping to the right, swiping upwards, or swiping downwards. Wherein, the operation of swiping to the left, swiping to the right, swiping upwards, or swiping downwards may be an operation of moving the display widget to the specified position in the navigation bar. For example, the specified position in the navigation bar is the middle, the user swiping to the left or swiping to the right may drag the display widget displayed in the navigation bar to move, and when the display widget moves to the middle position, it is regarded that the first specified operation has been performed on the display widget.

Alternatively, for a terminal capable of distinguishing the size of pressure, the first specified operation may also be a tap press or a forceful press.

In step 105, the displaying of the first object in the user interface is switched to the displaying of the second object.

In the aspect of the present disclosure, the operating system switches the displaying of the first object in the user interface to the displaying of the second object. The first object will not be displayed in the user interface, but rather the second object is displayed.

In summary, the method for displaying a display widget provided in the aspects of the present disclosure comprises: displaying a navigation bar and a user interface of an application program, the navigation bar being used for displaying widgets of n virtual buttons provided by an operating system; when a first object is displayed in the user interface, determining a second object corresponding to the first object; displaying in the navigation bar a display widget corresponding to the second object; receiving a first signal, the first signal being a signal generated according to a first specified operation that is triggered on the display widget; switching the displaying of the first object in the user interface to be the displaying of the second object. As the user interface of the application program and the navigation bar are simultaneously displayed, and when the first object is displayed in the user interface, displayed in the navigation bar is the display widget of the second object which corresponds to the same superior-level object as the first object, the display widget after being triggered switches the displaying of the first object in the user interface to be the displaying of the second object, thereby omitting the user's operation of first exiting the currently displayed first object and then selecting the second object from the superior-level directory for display. Therefore, the method for displaying an object provided by the present disclosure can reduce the user's operation steps when switching the current display object to another display object, and can directly complete the switching of the display objects while keeping the current user interface unchanged, thereby reducing the user's operations, improving the man-machine efficiency of switching objects.

In the method for displaying an object provided in the aspects of the present disclosure, the display widget may be displayed simultaneously with at least one of a return button, a home button, and a menu button in the navigation bar. In addition, the displaying of the display widget may also replace the displaying of the virtual buttons originally displayed in the navigation bar. The solution in which the displaying of the display widget replaces the displaying of virtual buttons originally displayed in the navigation bar will be described below with reference to FIG. 3A.

Figure 3A:
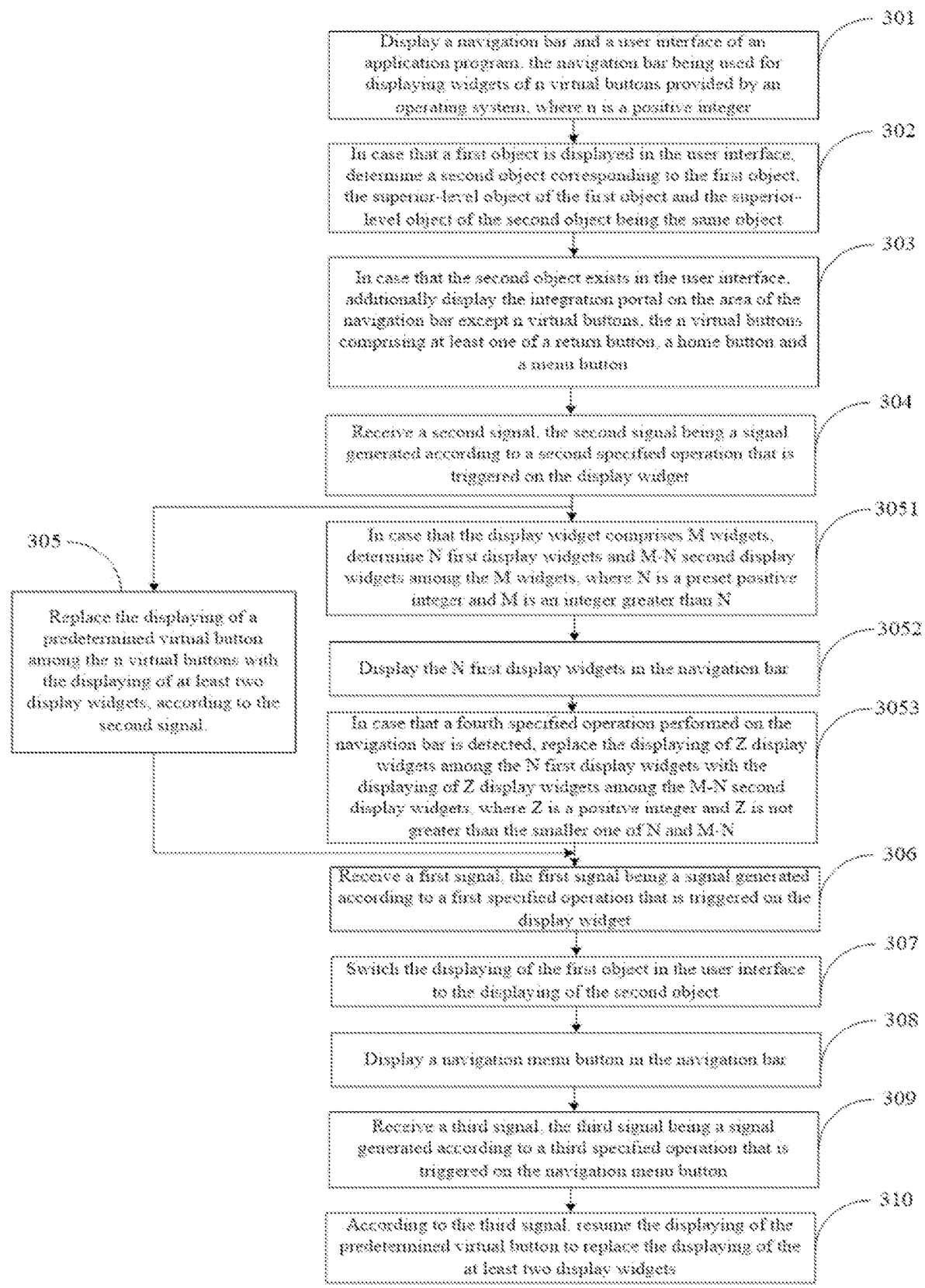
FIG. 3A is a flowchart of another method for displaying an object provided by an exemplary aspect of the present disclosure.

Referring to FIG. 3A, which is a flowchart of another method for displaying an object provided by an aspect of the present disclosure. The method may be used in the foregoing terminal. As shown in FIG. 3A, the method for displaying an object may comprise:

in step 301, displaying a navigation bar and a user interface of an application program, the navigation bar being used for displaying widgets of n virtual buttons provided by the operating system, where n is a positive integer.

In the aspect of the present disclosure, the execution process of step 301 is the same as the execution process of step 101. For details, refer to the execution process of step 101, which will not be described herein again.

In step 302, when the first object is displayed in the user interface, a second object corresponding to the first object is determined, the superior-level object of the first object and the superior-level object of the second object being the same object.

In the aspect of the present disclosure, the execution process of step 302 is the same as the execution process of step 102. For details, refer to the execution process of step 102, which will not be described herein again.

In step 303, when a second object exists in the user interface, an integration portal is additionally displayed on the area of the navigation bar except n virtual buttons, the n virtual buttons comprising at least one of a return button, a home button and a menu button.

In the aspect of the present disclosure, when the operating system determines the second object corresponding to the first object, the operating system may additionally display an integration portal in the area in the navigation bar other than the n virtual buttons displayed. Taking the n virtual buttons as a reference, the integration portal may be displayed in the left area or the right area of the n virtual buttons. Alternatively, the integration portal may also be displayed at a certain position between the n virtual buttons.

It should be noted that the integration portal can be used to integrate and accommodate the display widgets that need to be displayed in the navigation bar, and the integration portal can be displayed as a visual icon in the navigation bar.

Alternatively, when the display widget described above is a single widget, the operating system may not display the integrated portal described above, but directly display the display widget at the integrated portal described above. Or, when the display widget described above is a single widget, the operating system may also display the integration portal described above.

Alternatively, the widgets of the n virtual buttons provided by the operating system displayed in the navigation bar comprise at least one of a return button, a home button, a menu button, or a pull-down button of a state bar.

In step 304, a second signal is received, the second signal being a signal generated according to a second specified operation that is triggered on the integration portal.

The operating system may detect a second specified operation of the user with respect to the integration portal, and similar to the first specified operation, the second specified operation may be a short-time press touch, a long-time press touch, swiping to the left, swiping to the right, swiping upwards, or swiping downwards.

Alternatively, for a terminal capable of distinguishing the size of pressure, the second specified operation may also be a tap press or a forceful press.

When the above-mentioned second specified operation is detected, the operating system will receive the second signal generated according to the second specified operation.

In step 305, according to the second signal, the displaying of a predetermined virtual button among the n virtual buttons is replaced with the displaying of at least two display widgets.

When the display widget described above comprises at least two display widgets, after receiving the second signal, the operating system may display the at least two display widgets in the navigation bar according to the second signal and replace the previously displayed a predetermined virtual button therewith. For example, three virtual buttons are originally displayed in the navigation bar: a return button, a home button and a menu button, and the operating system will use at least two display widgets to replace the above-mentioned three virtual buttons according to the second signal. Wherein, each of the display widgets corresponds to one second object.

After the completion of the execution of step 305, it is equivalent to that the operating system has displayed the display widget corresponding to the second object in the navigation bar.

Figure 4A:
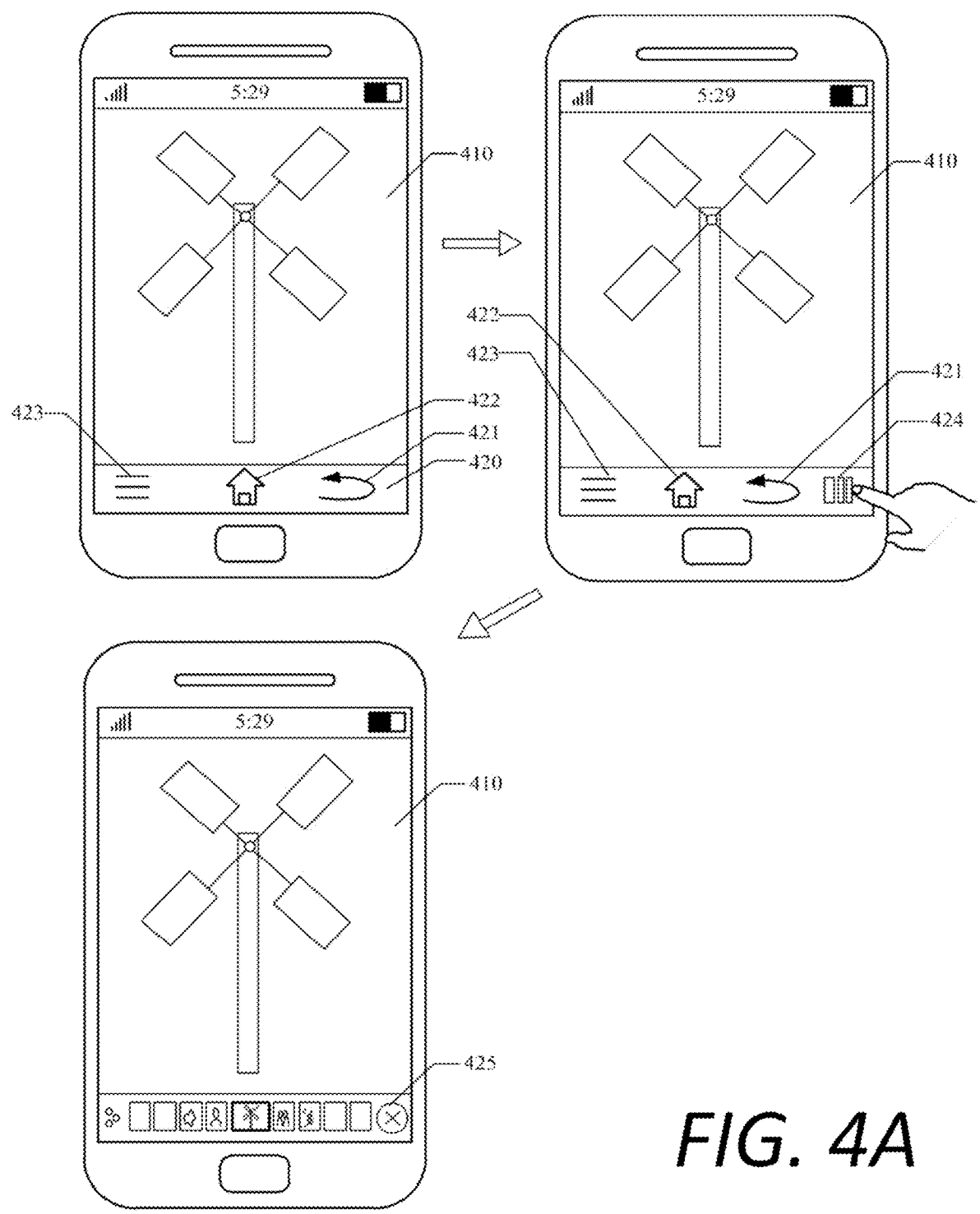
FIG. 4A is a schematic diagram of an interface of a display widget provided based on the aspect shown in FIG. 3A.

For example, please refer to FIG. 4A, which is a schematic diagram of an interface of a display widget provided based on the aspect shown in FIG. 3A. In FIG. 4A, the user interface 410 is a user interface of a photo album program P1. A navigation bar 420 is displayed together with the user interface 410. Three navigation buttons, a return button 421, a home button 422 and a menu button 423, respectively, are displayed in the navigation bar 420. When the operating system detects that there is a second object corresponding to the first object displayed in the user interface 410, for example, when the first object is the fifth photo in the photo album containing nine photos, the operating system uses the remaining eight photos as the second objects. The operating system will additionally display an integration portal 424 in the area of the navigation bar 420 except the above-mentioned three virtual buttons. At the time, the user can click on the integrated portal 424 with the finger, the operating system generates a second signal according to the click action (the second specified operation), and replaces of the displaying of the return button 421, the home button 422 and the menu button 423 with the displaying of eight display widgets (corresponding to the number of the second objects). In the navigation bar 420 in FIG. 4A, each box represents a display widget. Alternatively, a close button 425 may also be displayed in the navigation bar. When the close button 425 is triggered, the above-mentioned display widget will be hidden in the navigation bar.

In the aspect of the present disclosure, the execution of step 305 may also be replaced with the execution of step 3051, step 3052 and step 3053, to achieve the effect of step 305 of replacing the displaying of the predetermined virtual button among the n virtual buttons with the displaying of the display widget.

In step 3051, when the display widget comprises M widgets, N first display widgets and M-N second display widgets among the M widgets are determined, where N is a preset positive integer, and M is an integer greater than N.

Wherein, the value of N can be determined by the maximum number of display widgets that can be displayed in the navigation bar at the same time. For example, when at most five display widgets can be displayed in the navigation bar at the same time, the value of N is five.

In practical applications, the displayable area of the navigation bar is limited, and only at most N widgets can be displayed at the same time (for example, at most five display widgets can be displayed). When the number of display widgets M required to be displayed is greater than N, the operating system cannot display all the display widgets in the navigation bar at a time. In this case, the operating system may determine the N display widgets among the M widgets as the first display widgets and the remaining M-N widgets as the second display widgets.

In step 3052, the N first display widgets are displayed in the navigation bar.

In step 3053, when a fourth specified operation performed on the navigation bar is detected, the displaying of Z display widgets among the N first display widgets is replaced with the displaying of Z display widgets among the M-N second display widgets, where Z is a positive integer, and Z is not greater than the smaller one of N and M-N.

In the aspect of the present disclosure, the fourth specified operation may be swiping to the left, swiping to the right, swiping upwards or swiping downwards on the navigation bar. When the operating system detects the fourth specified operation, the displaying of Z display widgets among the N first display widgets currently displayed in the navigation bar is replaced by the displaying of Z display widgets among the M-N display widgets.

In the aspect of the present disclosure, when the display space in the navigation bar for accommodating the display widgets is limited, the navigation bar cannot simultaneously display all the display widgets. When the navigation bar switches the displaying of the current display widget to the displaying of another display widget, there may be different replacement manners, such as separate replacement manner, swiping replacement manner or full-page replacement manner. Wherein, the full-page replacement manner is that in the fourth operation, the entire display widgets currently displayed in the navigation bar are replaced by another page of display widgets. For example, when a total of five display widgets a, b, c, d and e are displayed in the current navigation bar, when the operating system detects the fourth specified operation in the navigation bar, the operating system moves all the five display widgets a to e out of the navigation bar, while displaying in the navigation bar other display widgets of the second object.

Figure 4B:
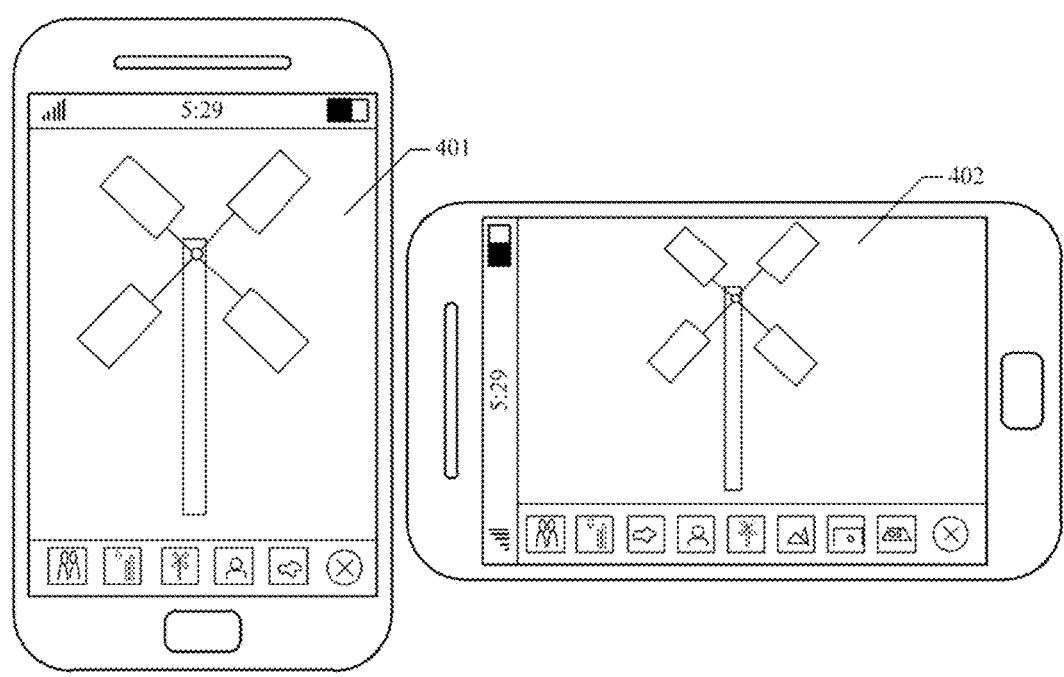
FIG. 4B is a schematic diagram of an interface provided based on the method for displaying an object shown in FIG. 3A.

For example, please refer to FIG. 4B, which is a schematic diagram of an interface provided based on the method for displaying an object shown in FIG. 3A. In FIG. 4B, the screen display state of the terminal comprises a portrait screen state 401 and a landscape screen state 402. The terminal determines, according to different screen display states, the number of display widgets that the navigation bar can display at the same time. For example, in the portrait screen state 401, the terminal can simultaneously display five display widgets. When being in the landscape screen state 402, the terminal can display eight display widgets at the same time.

Figure 4C:
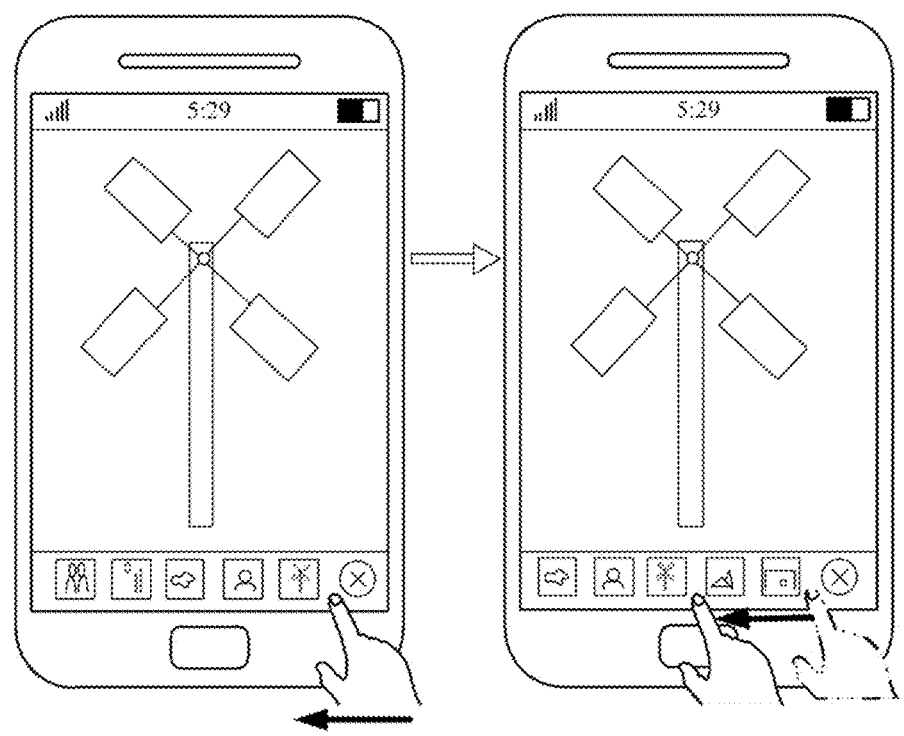
FIG. 4C is a schematic diagram illustrating a display widget shown based on the method for displaying an object provided in FIG. 3A.

Refer to FIG. 4C, which is a schematic diagram illustrating a display widget shown based on the method for displaying an object provided in FIG. 3A. FIG. 4C is used to illustrate the implementation process of the swiping replacement manner. In FIG. 4C, after the user's finger swipes to the left in the navigation bar, the display widget on the left in the navigation bar gradually is moved out of the navigation bar as the user's finger moves, and the number of display widgets that are moved out of the navigation bar is related with the swiping distance of the user's finger. The longer the user's finger swipes, the more the display widgets are moved out of the navigation bar. In FIG. 4C, the two left-most display widgets are moved out of the navigation bar, and at the same time, two other new display widgets appear in the area on the right side of the navigation bar.

Figure 4D:
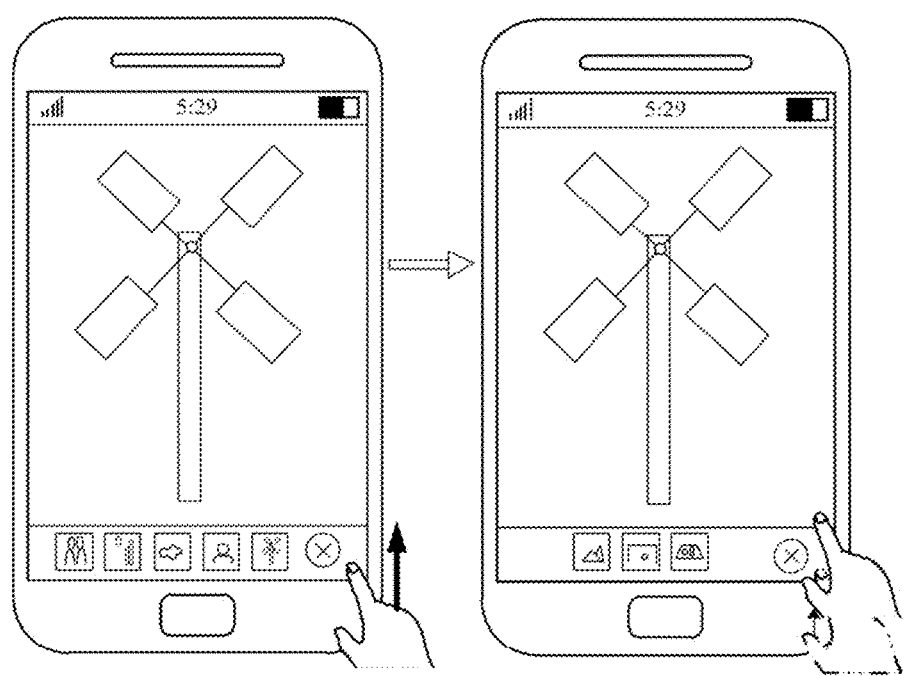
FIG. 4D is another schematic diagram illustrating a display widget shown based on the method for displaying an object provided in FIG. 3A.

Refer to FIG. 4D, which is another schematic diagram illustrating a display widget shown based on the method for displaying an object provided in FIG. 3A. FIG. 4D is used to illustrate the implementation process of the full-page replacement manner. In FIG. 4D, after the user's finger drags the navigation bar upwards, all the display widgets in the navigation bar (the full page) will be replaced by other display widgets.

It should be noted that, in the navigation bar shown in FIG. 4C or FIG. 4D, the display widget may display the corresponding second object under the click or long-time press operation of the user. For example, when the user clicks on a specified display widget, the user interface replaces it with and displays the second object corresponding to the specified display widget, and if the user presses the display widget for a long period of time, the user interface may display the second object while the user performs a long-time press, and the displaying of the first object resumes when the user releases the finger and finishes the long-time press operation.

Alternatively, widgets in the navigation bar may be the evenly spaced and arranged so that the widgets therein are aesthetically arranged and easy to operate.

In a possible implementation manner, when the operating system displays the display widget of the second object in the navigation bar, if the second object is a folder, contents contained in the folder will be displayed when the display widget is clicked. In order to further reduce the user's step of opening sub-objects in a second object (folder), there is designed in the present disclosure another method for displaying an object, which is implemented by step 3054, step 3055 or step 3056. Any one of the above-mentioned three steps may replace step 305 to implement the method for displaying an object as shown in FIG. 3A. For details, refer to FIG. 3B, which is a flowchart of another method for displaying an object provided by an aspect of the present disclosure.

In step 3054, when the sub-object contained in the second object is at least one folder, the display widget corresponding to each of the subordinate files and/or subordinate folders contained in each folder is displayed in the navigation bar.

In the aspect of the present disclosure, the second object may be a folder, in which at least one sub-object is contained, and the sub-object may be a file or a folder. In this step, when the operating system determines that all the sub-objects in the second object are folders, that is, when the sub-object contained in the second object is at least one folder, the display widget corresponding to each of the subordinate files and/or subordinate folders in each folder contained by the second object is displayed in the navigation bar.

Alternatively, when all the sub-objects contained in the second object are folders, the operating system may display, in the navigation bar, the respective display widget corresponding to each of the subordinate files and/or subordinate folders contained in each folder.

For example, the second object is the folder A, the folder A comprises the folder A1, the folder A1 comprises the file A11 and the file A12, and after determining the folder A as the second object, the operating system will display in the navigation bar the display widget of the file A11 and the display widget of the file A12.

Figure 3B:
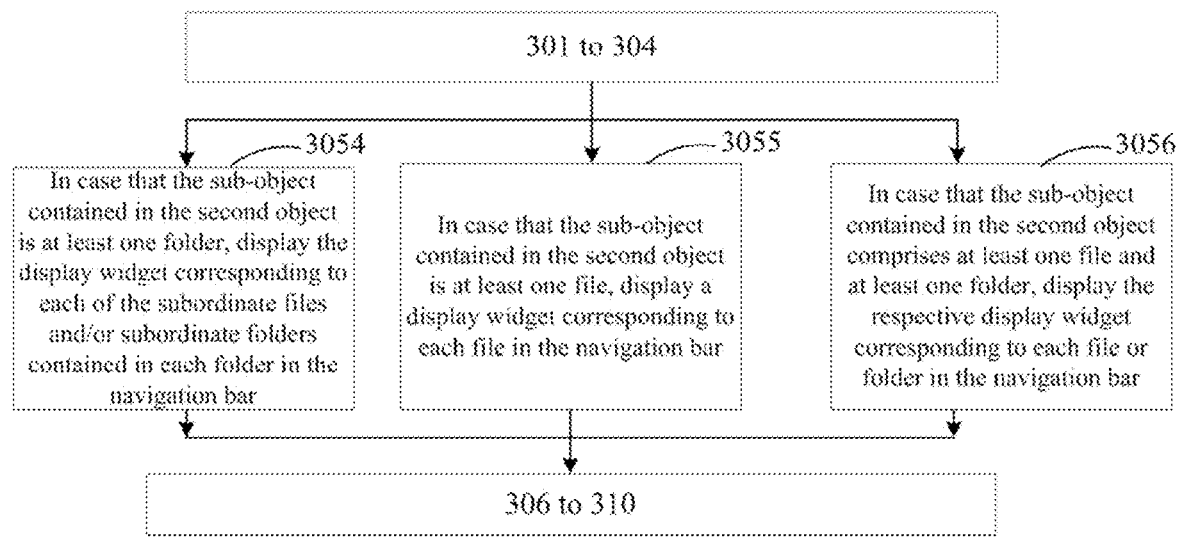
FIG. 3B is a flowchart of another method for displaying an object according to an exemplary aspect of the present disclosure.
Figure 4E:
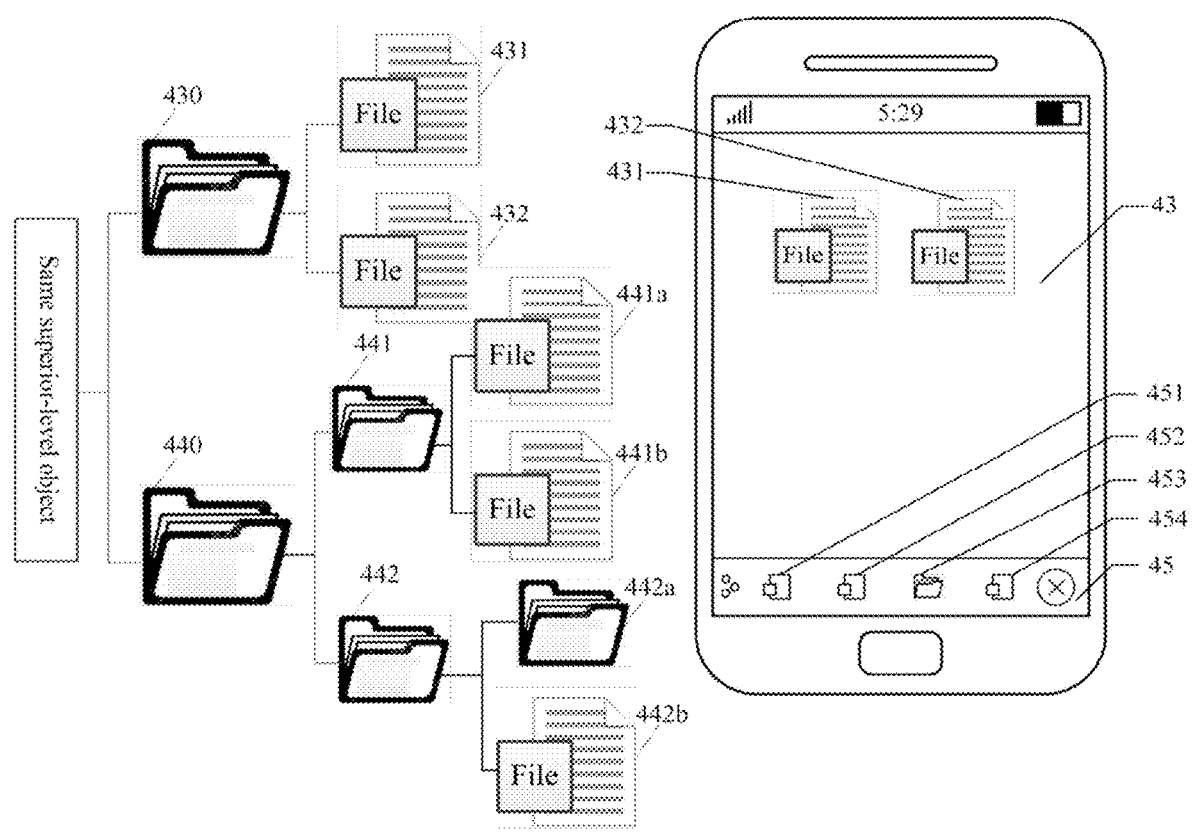
FIG. 4E is a schematic diagram illustrating a display widget shown based on the aspect shown in FIG. 3B.

For example, refer to FIG. 4E, which is a schematic diagram illustrating a display widget shown based on the aspect shown in FIG. 3B. In FIG. 4E, the first object is a folder 430, the folder 430 contains a file 431 and a file 432, an interface 43 after the folder 430 is opened is currently displayed in the user interface of the terminal, and the file 431 and the file 432 are displayed in the interface 43. At the time, the operating system determines that there is a corresponding second object of the folder 430, which second object is a folder 440, and the folder 440 comprises two sub-objects, respectively, a folder 441 and a folder 442. The folder 441 comprises a file 441a and a file 441b, and the folder 442 comprises a folder 442a and a file 442b. Since both the sub-object folder 441 and the folder 442 of the folder 440 are folders, the operating system will directly display, in the navigation bar 45, a display widget 451, a display widget 452, a display widget 453 and a display widget 454 corresponding to the subordinate file 441a and the subordinate file 441b in the folder 441 and the subordinate folder 442a and the subordinate file 442b in the folder 442, respectively.

In step 3055, when the sub-object contained in the second object is at least one file, a display widget corresponding to each file is displayed in the navigation bar.

In the aspect of the present disclosure, the second object may be a folder, in which at least one sub-object is contained. When the second object contains at least one sub-object, or when all the sub-objects contained in the second object are files, the operating system displays the respective display widget corresponding to each file in the navigation bar. For example, the second object is a folder B, and the folder B comprises a file B1, a file B2, and a file B3. After determining that all the sub-objects contained in the folder B are files, the operating system displays in the navigation bar the respective display widget corresponding to each of the file B1, the file B2 and the file B3.

Figure 4F:
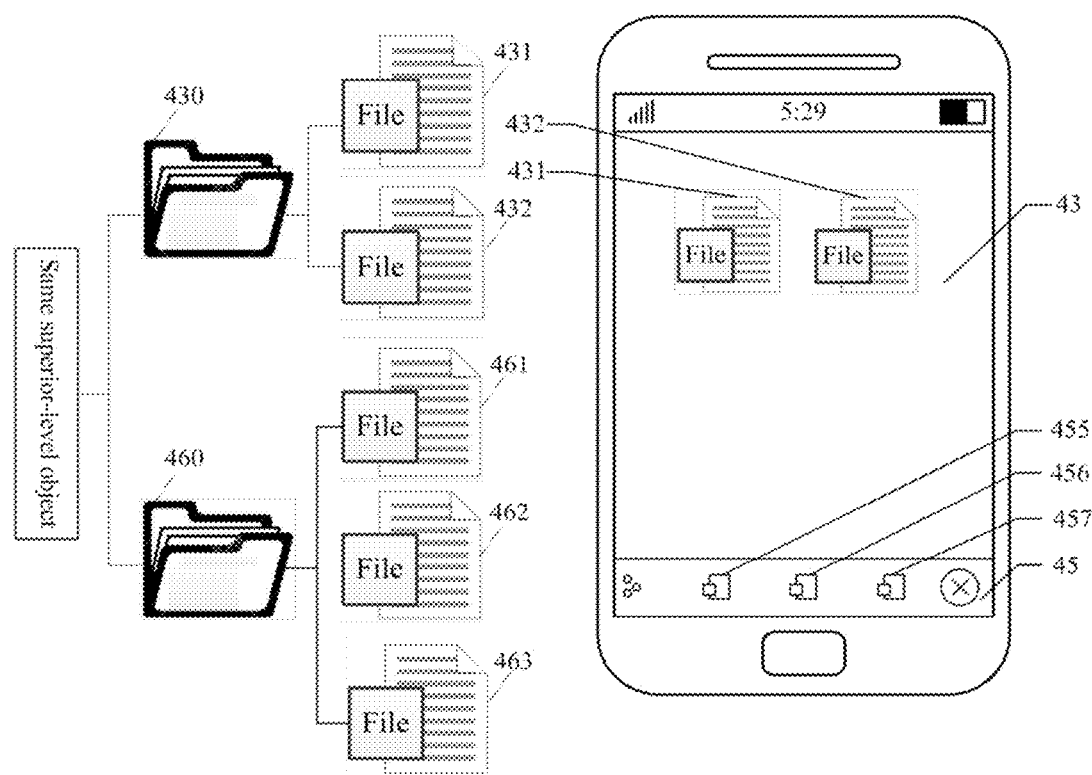
FIG. 4F is another schematic diagram illustrating a display widget shown based on the aspect shown in FIG. 3B.

For example, refer to FIG. 4F, which is another schematic diagram illustrating a display widget shown based on the aspect shown in FIG. 3B. In FIG. 4F, the first object is a folder 430, the folder 430 contains a file 431 and a file 432, an interface 43 after the folder 430 is opened is currently displayed in the user interface of the terminal, and the file 431 and the file 432 are illustrated on the interface 43. In this case, the operating system determines that there is a corresponding second object of the folder 430, which second object is a folder 460 that comprises three sub-objects, respectively, a file 461, a file 462, and a file 463. As all the sub-object files 461, 462 and 463 of the folder 460 are files, the operating system directly displays in the navigation bar 45 the display widget 455, the display widget 456, and the display widget 457 corresponding to the file 461, the file 462 and the file 463 respectively.

In step 3056, when the sub-object contained in the second object comprises at least one file and at least one folder, the respective display widget corresponding to each file or folder is displayed in the navigation bar.

In the aspect of the present disclosure, when the second object is a folder and the folder contains both files and folders (i.e., contains at least one file and at least one folder), the operating system displays in the navigation bar the files contained in the folders which are used as the second objects, and the respective display widgets corresponding to the folders. For example, the second object is the folder C, the folder C comprises the file C1 and the folder C2, and then after determining that the sub-objects in the folder C comprise both file and folder, the operating system displays in the navigation bar the respective display widget corresponding to the file C1 and the folder C2.

Figure 4G:
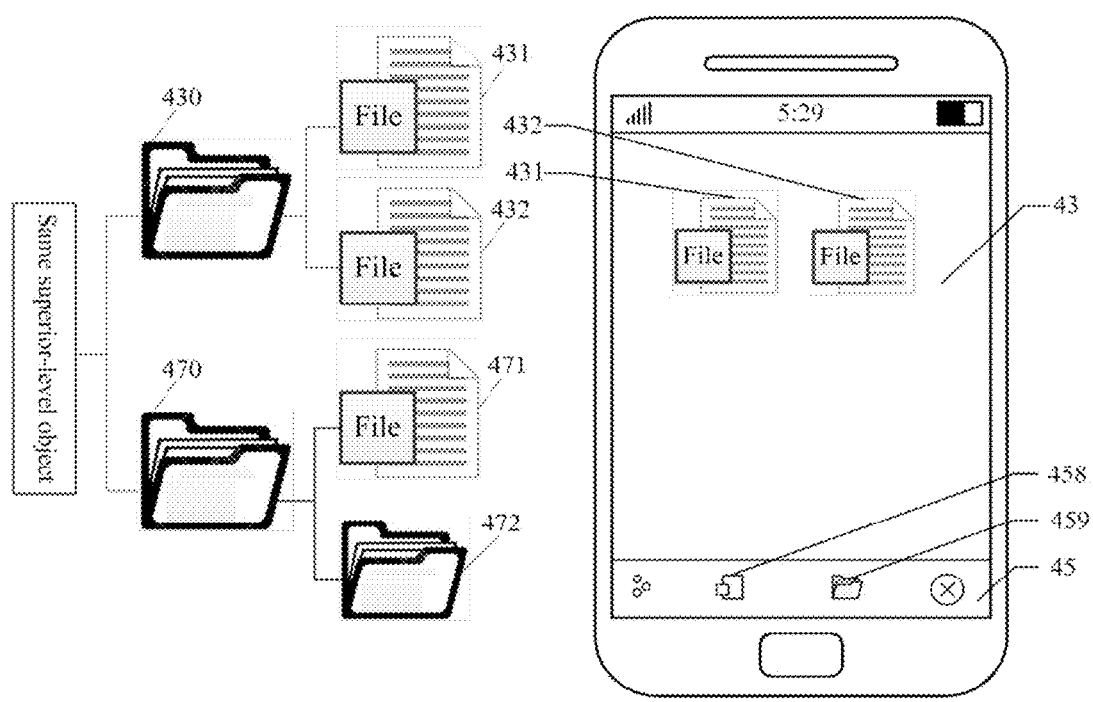
FIG. 4G is another schematic diagram illustrating a display widget shown based on the aspect shown in FIG. 3B.

For example, refer to FIG. 4G, which is another schematic diagram illustrating a display widget shown based on the aspect shown in FIG. 3B. In FIG. 4G, the first object is a folder 430, the folder 430 contains a file 431 and a file 432, an interface 43 after the folder 430 is opened is currently displayed in the user interface of the terminal, and the file 431 and the file 432 are illustrated in the interface 43. In this case, the operating system determines that there is a corresponding second object of the folder 430, which second object is a folder 470 that comprises two sub-objects, a file 471 and a folder 472, respectively. As the sub-objects of the folder 470 contain both file and folder, the operating system displays in the navigation bar 45 the display widget 458 and the display widget 459 corresponding to the file 471 and the file 472 respectively.

In step 306, a first signal is received, the first signal being a signal generated according to a first specified operation that is triggered on the display widget.

In step 307, the displaying of the first object in the user interface is replaced by the displaying of the second object.

In the aspect of the present disclosure, the operating system switches the displaying of the first object in the user interface to the displaying of the second object. When the first object is an object in the user interface, other contents in the user interface will not change, but only the first object may be switched to the second object for display.

Alternatively, if the first object itself is the full display page in the current user interface, the display page is as a whole replaced by a new display page (the second object).

In step 308, a navigation menu button is displayed in the navigation bar.

In the aspect of the present disclosure, when n virtual buttons are replaced by display widgets in the navigation bar, the operating system may display a navigation menu button in the navigation bar. This navigation menu button is used for re-illustrating a predetermined virtual button provided by the operating system.

Alternatively, for operational convenience, the navigation menu button may be displayed at at least one of the leftmost and the rightmost of the navigation bar. For example, for the convenience of the user to control from the left side of the navigation bar, the navigation menu button can be displayed on the leftmost side of the navigation bar. Or, for the convenience of the user to control from the right side of the navigation, the navigation menu button may also be displayed on the rightmost side of the navigation bar. Or, the navigation menu button can display the leftmost side of the navigation bar and the rightmost side of the navigation bar at the same time. In the case of simultaneous display, the icon patterns of the navigation menu button displayed on the leftmost side and the navigation menu button displayed on the rightmost side may be different patterns or the same pattern.

In step 309, a third signal is received, the third signal being a signal generated according to a third specified operation that is triggered on the navigation menu button.

The operating system may detect a third specified operation of the user for the navigation menu button, and similar to the first specified operation, the third specified operation may be a short-time press touch, a long-time press touch, swiping to the left, swiping to the right, swiping upwards, or swiping downwards.

Alternatively, for a terminal capable of distinguishing the size of pressure, the third specified operation may also be a tap press or a forceful press.

When the above-mentioned third specified operation is detected, the operating system will receive the third signal generated according to the third specified operation.

In step 310, according to the third signal, the displaying of the predetermined virtual button resumes to replace the displaying of the at least two display widgets.

In the aspect of the present disclosure, the operating system resumes the displaying of the predetermined virtual button according to the third signal to replace the displaying of at least two display widgets. That is, when determining that the user has triggered the navigation menu button, the operating system resumes the displaying of the predetermined virtual button originally displayed in the navigation bar and moves the display widgets out of the navigation bar. At the same time, the operating system will redisplay the integration portal in the navigation bar so that the user can use the display widget in the navigation bar again to cause the user interface to illustrate the second object corresponding to the display widget.

Figure 4H:
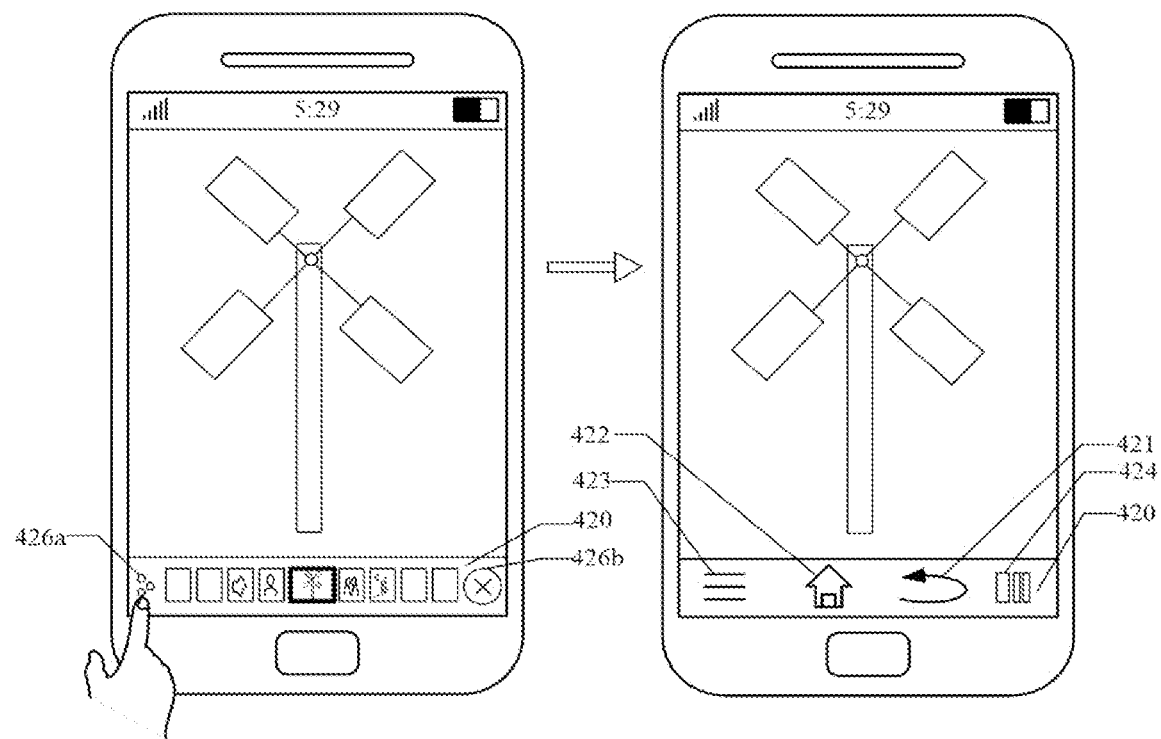
FIG. 4H is a schematic diagram of another display object provided based on the aspect shown in FIG. 3A.

For example, FIG. 4H, which is a schematic diagram of another display object provided based on the aspect shown in FIG. 3A, is taken as an example. In FIG. 4H, a navigation menu button 426a is displayed in the navigation bar 420. When detecting that the navigation menu button 426a is triggered, the operating system resumes the displaying of a return button 421, a home button 422, a menu button 423, and an integrated portal 424 in the navigation bar. It should be noted that in order to facilitate the user to resume the displaying of the return button 421, the home button 422, the menu button 423 and the integration portal 424 from the right side of the navigation bar, another navigation menu button 426b is displayed on the right side of the navigation bar 420 in FIG. 4H. When the navigation menu button 426b is triggered, the navigation bar 420 also resumes the displaying of the return button 421, the home button 422, the menu button 423, and the integration portal 424.

In order to facilitate understanding, an application scenario of a method for displaying an object provided by the aspects of the present disclosure is an implementable application scenario in which the terminal is a smart phone.

The operating system of the smart phone acquires the affiliation of the second page (the second object) of "Essay A" of a novel reading APP (a target application) displayed on the screen and determines that the second page belongs to "Essay A" (superior-level object), and according to the affiliation of "Essay A", it knows that its subordinate-level object further comprises, in addition to the second page, four objects, the first page, the third page, the fourth page and the fifth page, and determines the four objects as the first objects. Four display widgets corresponding to the four first objects are generated. In the navigation bar, the four display widgets are displayed. At the time, the display situation of the screen of the terminal is as follows: the second page of "Essay A" in the novel reading APP is displayed in the display area of the screen, and display widgets corresponding to the first page, the third page, the fourth page and the fifth page of "Essay A" respectively are illustrated in the navigation bar.

Figure 4I:
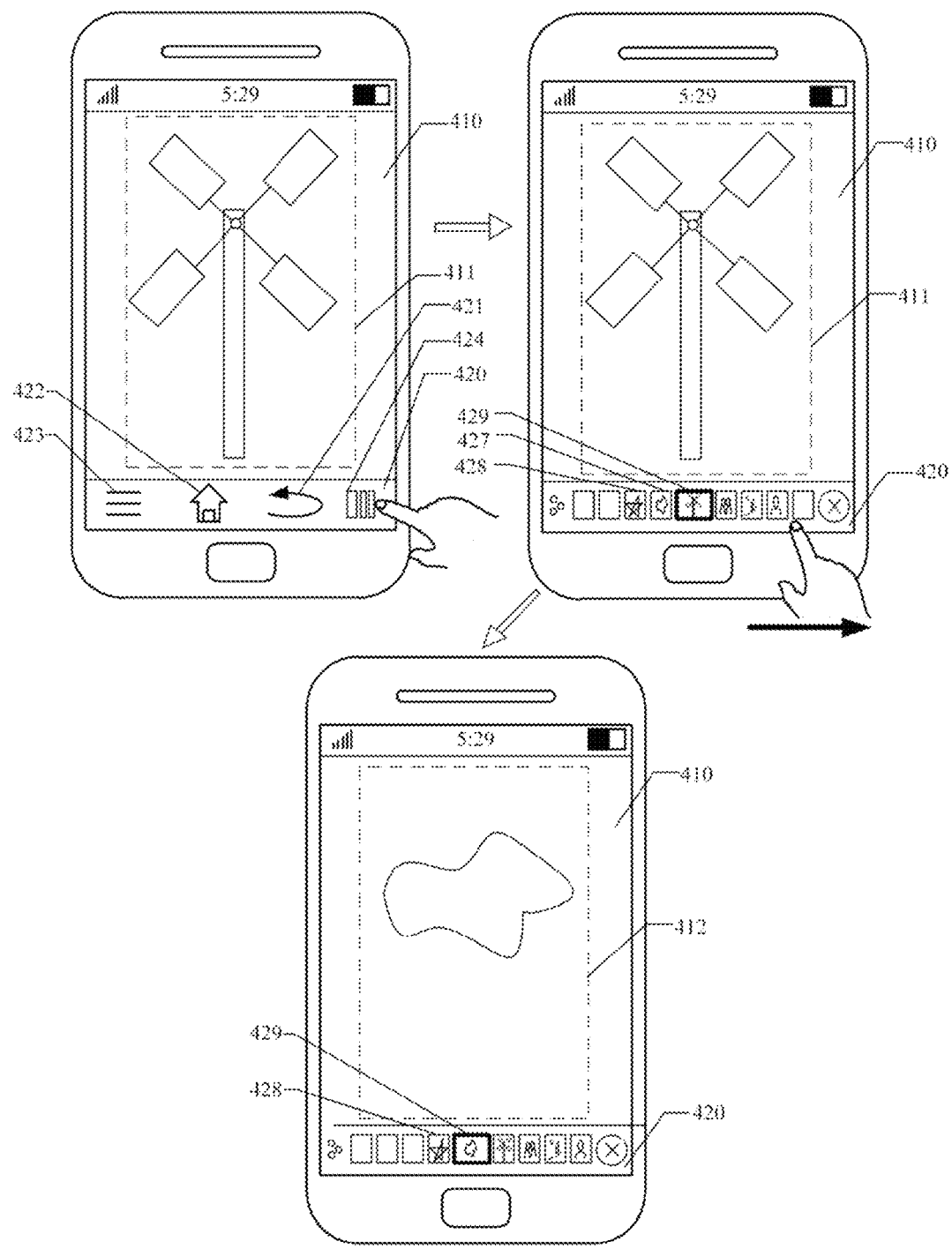
FIG. 4I is a schematic diagram of another display object provided based on the aspect shown in FIG. 3A.

For another example, refer to FIG. 4I, which is a schematic diagram of another display object provided based on the aspect shown in FIG. 3A. In FIG. 4I, the smart phone displays the portrait 411 of person A (the first object) in a news APP (the target application program) in the display area of the interface 410 while displaying the return button 421, the home button 422, the menu button 423 and the integration portal 424 in the navigation bar 420. When the operating system determines that the portrait 411 of person A corresponds to other photos contained in the report photo album of news B and, it is determined that the second objects are the scenery photo C and the night scenery photo D. Subsequently, the operating system respectively acquires the size and position of the display area when the scenery photo C and the night scenery photo D are displayed, and the respective storage positions of the scenery photo C and the night scenery photo D. The operating system correlates the display widget 427 of the scenery photo C with the size and position of the display area when the scenery photo C is displayed and the storage position. At the same time, the operating system correlates the display widget 428 of the night scenery photo D with the size and position of the display area when the night scenery photo D is displayed and the storage position. At the time, after the user clicks the integration portal 424, the display widget 427 and the display widget 428 will be displayed in the navigation bar. In the navigation bar 420, there is a specified position 429. When the user swipes the display widget in the navigation bar to place the display widget 427 in the specified position 429, the interface 410 will display the scenery photo C 412 corresponding to the display widget 427.

To sum up, the method for displaying an object provided by the aspects of the present disclosure comprises: displaying a navigation bar and a user interface of an application program, the navigation bar being used for displaying widgets of n virtual buttons provided by an operating system; when a first object is displayed in the user interface, determining a second object corresponding to the first object; displaying in the navigation bar a display widget corresponding to the second object; when a first specific operation performed on the display widget is detected, switching the displaying of the first object in the user interface to the displaying of the second object. As the user interface of the application program and the navigation bar are simultaneously displayed, and when the first object is displayed in the user interface, displayed in the navigation bar is the display widget of the second object which corresponds to the same superior-level object as the first object, the display widget after being triggered switches the displaying of the first object in the user interface to the displaying of the second object, thereby omitting the user's operation of first exiting the currently displayed first object and then selecting the second object from the superior-level directory for display.

Therefore, the method for displaying an object provided by the present disclosure can reduce the user's operation steps when switching the current display object to another display object, and can directly complete the switching of the display objects while keeping the current user interface unchanged, thereby reducing the user's operations, improving the man-machine efficiency of switching objects.

In addition, by additionally displaying the integration portal on the area of the navigation bar except n virtual buttons, the n virtual buttons comprising at least one of a return button, a home button and a menu button; receiving a second signal, the second signal being a signal generated according to the second specified operation that is triggered on the integration portal, replacing the displaying of a predetermined virtual button among the n virtual buttons, according to the second signal, with the displaying of the display widget, the navigation bar is enabled to always display the virtual button or the widget needed by the user, improving the space utilization efficiency of the navigation bar.

In addition, when the sub-object contained in the second object is at least one folder, the operating system in the aspect of the present disclosure displays, in the navigation bar, the respective display widget corresponding to each subordinate file and/or subordinate folder contained in each folder, so that when the second object is a folder and the type of the sub-object therein is only folder, the respective display widget corresponding to each subordinate file and/or subordinate folder in the sub-object is directly displayed in the navigation bar, to facilitate the user to directly open the subordinate file of the sub-object in the second object in the navigation bar, reducing the steps of the user opening a multi-layer folder and improving the efficiency of the user opening the files in the multi-layer folder.

In addition, when the sub-object contained in the second object is at least one file or the sub-object comprises both file and folder at the same time, the operating system in the aspect of the present disclosure displays the display widget corresponding to the sub-object in the navigation bar. When determining that the second object is a folder and the folder comprises not only folders, the operating system displays the display widget corresponding to the sub-object in the navigation bar. The terminal is enabled to directly illustrate the display widget of the sub-object in the second object as a folder, reducing the steps of the user opening the sub-object in the second object, and improving the efficiency of the user opening the sub-object in the second object.

In addition, by determining, when the display widget comprises M widgets, N first display widgets and M-N second display widgets among the M widgets, where N is a preset positive integer and M is an integer greater than N, displaying the N first display widgets in the navigation bar, and when a fourth specified operation performed on the navigation bar is detected, replacing the displaying of Z display widgets among the N first display widgets with the displaying of Z display widgets among the M-N second display widgets, where Z is a positive integer and Z is not greater than the smaller one of N and M-N, the efficiency of switching the display widget in the navigation bar is improved.

In addition, by displaying the navigation menu button in the navigation bar, when a third specified operation performed on the navigation menu button is detected, resuming the displaying of the predetermined virtual button to replace the displaying of the display widget, the displaying of the predetermined virtual button of the terminal can be resumed after using the display widget, improving the availability of the basic functions of the navigation bar.

Figure 5:
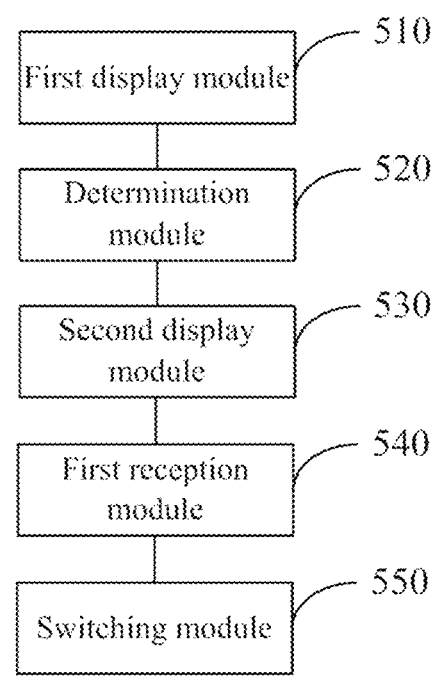
FIG. 5 is a structural block diagram of an apparatus for displaying a widget according to an exemplary aspect of the present disclosure.

Refer to FIG. 5, which is a structural block diagram of an apparatus for displaying a widget according to an exemplary aspect. The functions of the apparatus may be implemented by pure hardware or by hardware executing corresponding software, so as to implement the steps listed in FIG. 1, FIG. 3A or FIG. 3B. As shown in FIG. 5, the apparatus for displaying an object may comprise a first display module 510, a determination module 520, a second display module 530, a first reception module 540, and a switching module 550.

The first display module 510 is used for displaying a navigation bar and a user interface of an application program, the navigation bar being used for displaying widgets of n virtual buttons provided by an operating system, where n is a positive integer;

the determination module 520 is used for, if a first object is displayed in the user interface, determining a second object corresponding to the first object, the superior-level object of the first object and the superior-level object of the second object being the same object;

the second display module 530 is used for displaying in the navigation bar a display widget corresponding to the second object;

the first reception module 540 is used for receiving a first signal, the first signal being a signal generated according to a first specified operation that is triggered on the display widget;

the switching module 550 is used for, when a first specific operation performed on the display widget is detected, switching the displaying of the first object in the user interface to the displaying of the second object.

Figure 6:
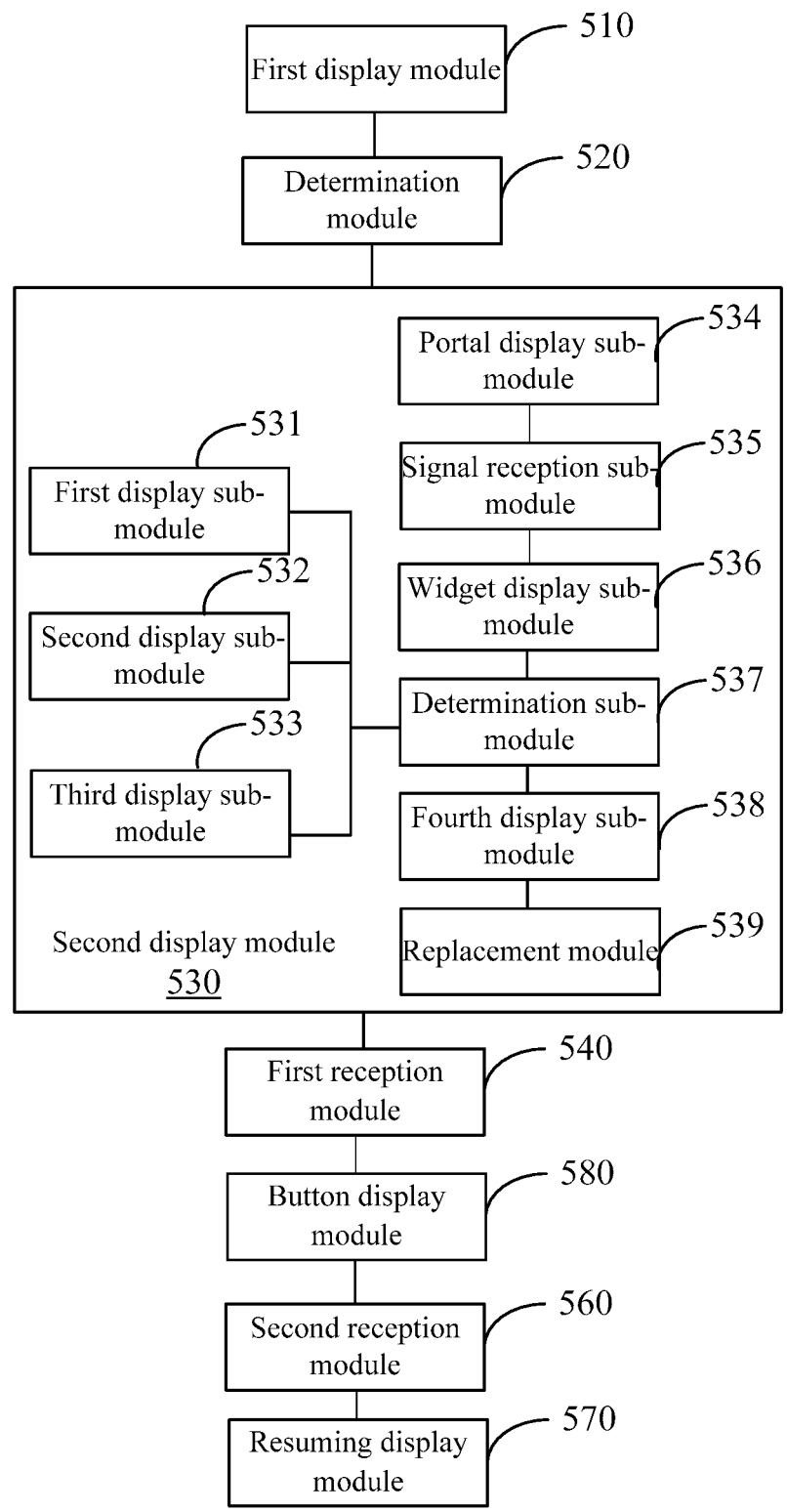
FIG. 6 shows a structural block diagram of another apparatus for displaying an object provided by an exemplary aspect of the present disclosure.

Further, refer to FIG. 6, which shows a structural block diagram of another apparatus for displaying an object provided by an aspect of the present disclosure. In conjunction with FIG. 5, in the apparatus shown in FIG. 6:

alternatively, the second object is a folder containing at least one sub-object, and the second display module 530 comprises: a first display sub-module 531, a second display sub-module 532 and a third display sub-module 533.

The first display sub-module 531 is used for, when the sub-object is at least one folder, displaying, in the navigation bar, the respective display widget corresponding to each subordinate file and/or subordinate folder contained in each of said folders.

The second display sub-module 532 is used for, when the sub-object is at least one file, displaying, in the navigation bar, the respective display widget corresponding to each of the files.

The third display sub-module 533 is used for, when the sub-object contains at least one file and at least one folder, displaying, in the navigation bar, the respective display widget corresponding to each of the files or the folders.

The second object is at least two objects, and the second display module 530 comprises: a portal display sub-module 534, a signal reception sub-module 535 and a widget display sub-module 536.

The portal display sub-module 534 is used for displaying an integration portal in the navigation bar;

the signal reception sub-module 535 is used for receiving a second signal, the second signal being a signal generated according to a second specified operation that is triggered on the integration portal;

the widget display sub-module 536 is used for displaying in the navigation bar, according to the second signal, the respective display widget corresponding to each of the at least two second objects.

Alternatively, the portal display sub-module 534 is used for, when the second object exists in the user interface, additionally displaying the integration portal on the area of the navigation bar except n virtual buttons, the n virtual buttons comprising at least one of a return button, a home button and a menu button;

the widget display sub-module 536 is used for, according to the second signal, replacing the displaying of a predetermined virtual button among the n virtual buttons with the displaying of the at least two display widgets.

Alternatively, the apparatus further comprises: a button display module 580, a second reception module 560, and a resuming display module 570.

The button display module 580 is used for displaying a navigation menu button in the navigation bar;

the second reception module 560 is used for receiving a third signal, the third signal being a signal generated according to a third specified operation that is triggered on the navigation menu button;

the resuming display module 570 is used for according to the third signal, resuming the displaying of the predetermined virtual button to replace the displaying of the at least two display widgets.

Alternatively, the second display module 530 comprises: a determination module 537, a display sub-module 538 and a replacement module 539.

The determination module 537 is used for, when the display widget comprises M widgets, determining N first display widgets and M-N second display widgets among the M widgets, where N is a preset positive integer and M is an integer greater than N;

the fourth display sub-module 538 is used for displaying the N first display widgets in the navigation bar;

the replacement module 539 is used for, when a fourth specified operation performed on the navigation bar is detected, replacing the displaying of Z display widgets among the N first display widgets with the displaying of Z display widgets among the M-N second display widgets, where Z is a positive integer and Z is not greater than the smaller one of N and M-N.

Alternatively, at least one of the thumbnail of the second object and thumbnail text information corresponding to the second object is displayed in the display widget.

Alternatively, the first specified operation performed on the display widget comprises: a click operation or a long-time press operation on the display widget; or, moving the display widget to a specified position in the navigation bar.

For details, refer to the above-mentioned method aspects.

Further provided in an exemplary aspect of the present disclosure is an apparatus for displaying an object, capable of implementing the method for displaying an object provided by the present disclosure. The apparatus comprises: a processor, and a memory for storing executable instructions of the processor. Wherein the processor is configured to:

display a navigation bar and a user interface of an application program, the navigation bar being used for displaying widgets of n virtual buttons provided by an operating system, where n is a positive integer;

when a first object is displayed in the user interface, determine a second object corresponding to the first object, the superior-level object of the first object and the superior-level object of the second object being the same object;

display in the navigation bar a display widget corresponding to the second object;

receive a first signal, the first signal being a signal generated according to a first specified operation that is triggered on the display widget;

switch the displaying of the first object in the user interface to be the displaying of the second object.

Alternatively, the second object is a folder containing at least one sub-object, and displaying in the navigation bar a display widget corresponding to the second object comprises:

when the sub-object is at least one folder, displaying, in the navigation bar, the respective display widget corresponding to each subordinate file and/or subordinate folder contained in each of the folders; or when the sub-object is at least one file, displaying, in the navigation bar, the respective display widget corresponding to each of the files; or when the sub-object contains at least one file and at least one folder, displaying, in the navigation bar, the respective display widget corresponding to each of the files or the folders.

Alternatively, the second object is at least two objects, and displaying in the navigation bar a display widget corresponding to the second object comprises:

displaying an integration portal in the navigation bar;

receiving a second signal, the second signal being a signal generated according to a second specified operation that is triggered on the integration portal;

displaying in the navigation bar, according to the second signal, the respective display widget corresponding to each of the at least two second objects.

Alternatively, displaying an integration portal in the navigation bar comprises:

when the second object exists in the user interface, additionally displaying the integration portal on the area of the navigation bar except n virtual buttons, the n virtual buttons comprising at least one of a return button, a home button and a menu button;

displaying in the navigation bar, according to the second signal, the respective display widget corresponding to each of the at least two second objects comprises:

according to the second signal, replacing the displaying of a predetermined virtual button among the n virtual buttons with the displaying of the at least two display widgets.

Alternatively, the apparatus is further configured to:

display a navigation menu button in the navigation bar;

receive a third signal, the third signal being a signal generated according to a third specified operation that is triggered on the navigation menu button;

according to the third signal, resume the displaying of the predetermined virtual button to replace the displaying of the at least two display widgets.

Alternatively, displaying in the navigation bar a display widget corresponding to the second object comprises:

when the display widget comprises M widgets, determining N first display widgets and M-N second display widgets among the M widgets, where N is a preset positive integer and M is an integer greater than N;

displaying the N first display widgets in the navigation bar;

when a fourth specified operation performed on the navigation bar is detected, replacing the displaying of Z display widgets among the N first display widgets with the displaying of Z display widgets among the M-N second display widgets, where Z is a positive integer and Z is not greater than the smaller one of N and M-N.

Alternatively, at least one of the thumbnail of the second object and thumbnail text information corresponding to the second object is displayed in the display widget.

Alternatively, the first specified operation performed on the display widget comprises:

a click operation or a long-time press operation on the display widget; or moving the display widget to a specified position in the navigation bar.

It should be noted that the apparatus for displaying an object provided by the foregoing aspects is described merely taking an example of the division of the foregoing functional modules when implementing the functions. In actual applications, the foregoing functions may be allocated and completed by different functions according to actual needs, that is, the content structure of the device is divided into different functional modules to complete all or part of the functions described above.

With respect to the apparatus for displaying an object in the foregoing aspects, a specific manner in which each module performs an operation has been described in detail in the aspects related to the method, and will not be elaborated herein.

Figure 7:
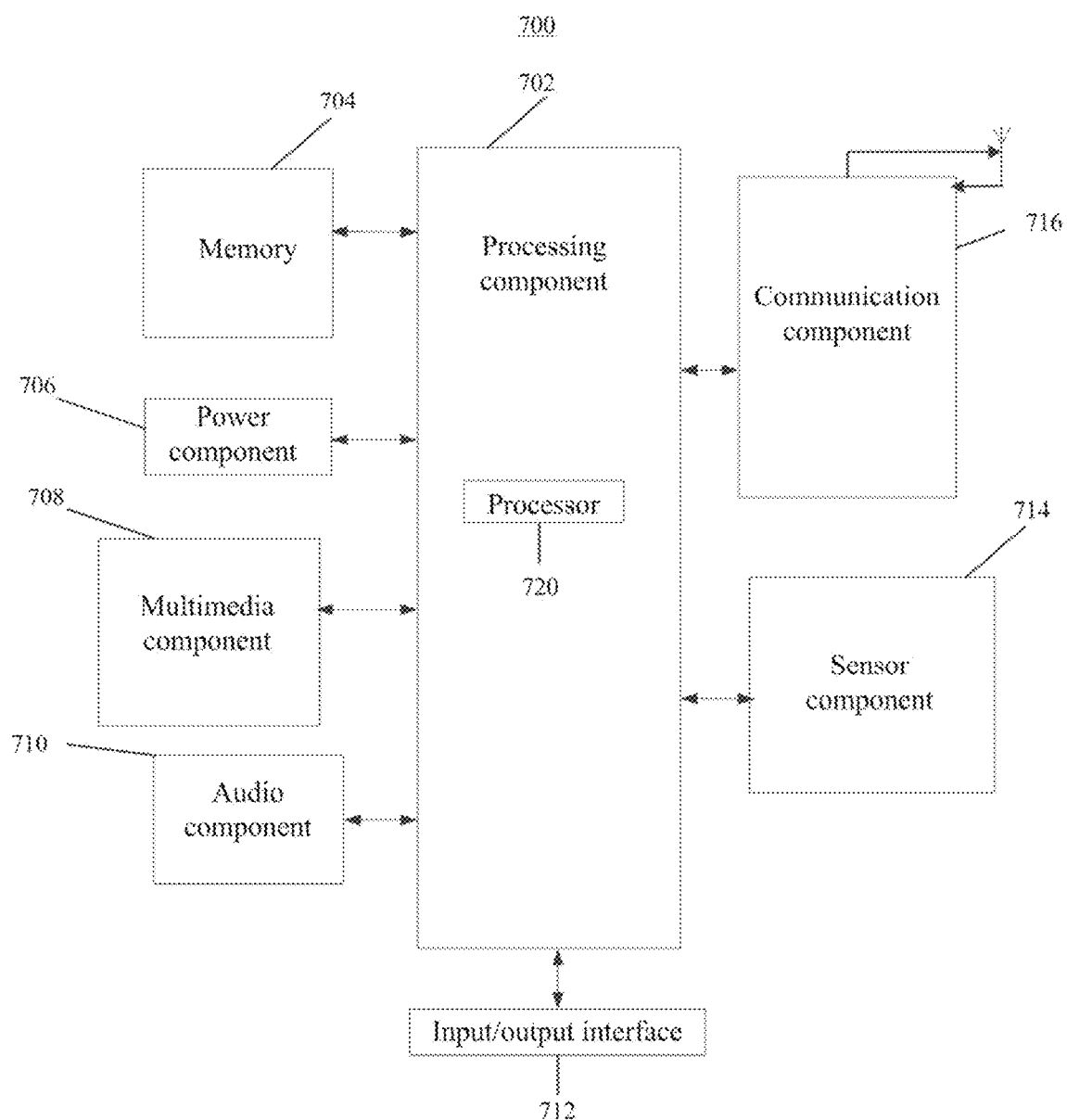
FIG. 7 is a block diagram of an apparatus shown according to an exemplary aspect of the present disclosure.

Refer to FIG. 7, which is a block diagram of an apparatus 700 shown according to an exemplary aspect. For example, the apparatus 700 may be a terminal. In FIG. 7, the apparatus 700 may comprise one or more of the following components: processing component 702, memory 704, power component 706, multimedia component 708, audio component 710, input/output (I/O) interface 712, sensor component 714 and communication component 716.

The processing component 702 generally controls the overall operation of the apparatus 700, such as an operation associated with display, data communications, camera operations and recording operations. The processing component 702 may comprise one or more processors 720 to execute instructions to perform all or part of the steps of the methods described above. In addition, the processing component 702 may comprise one or more modules to facilitate the interaction between the processing component 702 and other components. For example, the processing component 702 may comprise a multimedia module to facilitate the interaction between the multimedia component 708 and the processing component 702.

The memory 704 is configured to store various types of data to support the operations at the apparatus 700. Examples of these data comprise instructions for any application program or method operated on the apparatus 700. The memory 704 may be implemented by any type of volatile or non-volatile storage device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 706 provides power to various components of the apparatus 700. The power component 706 may comprise a power management system, one or more power sources, and other components associated with generating, managing, and distributing power for the apparatus 700.

The multimedia component 708 comprises a screen providing an output interface between the apparatus 700 and the user. In some aspects, the screen may comprise a liquid crystal display (LCD) and a touch panel (TP). If the screen comprises a touch panel, the screen may be implemented as a touch screen to receive input signals from the user. The touch panel comprises one or more touch sensors to sense touches, swipes, and gestures on the touch panel. The touch sensor may not only sense the boundary of a touch or swipe action, but also detect the duration and pressure associated with the touch or swipe operation. In some aspects, the multimedia component 708 comprises a front camera and/or a rear camera. When the apparatus 700 is in an operation mode, such as a shooting mode or a video mode, the front camera and/or the rear camera may receive external multimedia data. Each front camera and rear camera may be a fixed optical lens system or have focal length and optical zoom capabilities.

The audio component 710 is configured to output and/or input audio signals. For example, the audio component 710 comprises a microphone (MIC) that is configured to receive external audio signals when the apparatus 700 is in an operating mode, such as a call mode, a recording mode, or a voice recognition mode. The received audio signals may be further stored in the memory 704 or sent via the communication component 716. In some aspects, the audio component 710 further comprises a speaker for outputting audio signals.

The I/O interface 712 provides an interface between the processing component 702 and a peripheral interface module, and the peripheral interface module may be a keyboard, a click wheel, a button, or the like. These buttons may comprise, but are not limited to, a home button, a volume button, a start button, and a lock button.

The sensor assembly 714 comprises one or more sensors for providing the apparatus 700 with state assessments of various aspects. For example, the sensor assembly 714 may detect the ambient temperature at which the apparatus 700 is located, and the temperature of the water may be detected. The sensor assembly 714 may also detect a change in the position of the apparatus 700 or a component of the apparatus 700, the presence or absence of user contact with the apparatus 700, the orientation of the apparatus 700 or acceleration/deceleration. The sensor assembly 714 may further comprise a light sensor, such as a CMOS or CCD image sensor, for use in imaging applications. In some aspects, the sensor assembly 714 may further comprise an acceleration sensor, a gyroscope sensor, a magnetic sensor, or a pressure sensor.

The communication component 716 is configured to facilitate wired or wireless communications between the apparatus 700 and other devices. The apparatus 700 may access a wireless network based on a communication standard, such as Wi-Fi, 2G, 3G, 4G or 5G, or a combination thereof. In one exemplary aspect, the communication component 716 receives a broadcast signal or broadcast related information from an external broadcast management system via a broadcast channel. In one exemplary aspect, the communication component 716 further comprises a near field communication (NFC) module to facilitate short-range communications. For example, the NFC module may be implemented based on radio frequency identification (RFID) technology, infrared data association (IrDA) technology, ultra-wideband (UWB) technology, Bluetooth (BT) technology, and other technologies.

In an exemplary aspect, the apparatus 700 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above-mentioned methods.

It may be appreciated by those of ordinary skill in the art that, all or part of the steps of implementing the foregoing aspects may be completed by hardware or by using program instructions in conjunction with related hardware. The program instructions may be stored in a storage device, which storage device contains a computer readable storage medium. The storage medium mentioned above may be a read only memory, a solid state drive (SSD), a flash memory, a magnetic disk or an optical disk. When executed by the processor 720 of the terminal, the instructions in the computer readable storage medium enables the terminal to execute the method for displaying the objects shown in FIG. 1, FIG. 3A or FIG. 3B.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will readily occur to those skilled in the art upon consideration of the description and practice of the disclosures disclosed herein. The present application is intended to cover any variations, uses, or adaptations of the disclosure, and the variations, uses, or adaptations follow the general principles of the disclosure and comprise the common general knowledge or conventional technical means that are not disclosed in the present disclosure. The description and aspects are considered as exemplary only, with the true scope and spirit of the disclosure being indicated by the following claims.

It should be understood that the present disclosure is not limited to the precise structures that have been described above and shown in the drawings, and that various modifications and changes may be made without departing from the scope thereof. The scope of the disclosure is limited only by the accompanying claims.

What is claimed is:

1. A method for displaying an object, comprising:
   displaying a navigation bar and a user interface of an application program, wherein the navigation bar is configured to display widgets of n virtual buttons provided by an operating system, where n is a positive integer;
   when a first object is displayed in the user interface, determining a second object corresponding to the first object, wherein the first object and the second object are a part of a superior-level object;
   displaying in the navigation bar a display widget corresponding to the second object; receiving a first signal that is generated based on a first specified operation that is triggered on the display widget; and
   switching a display of the first object in the user interface to a display of the second object,
   wherein the second object is a folder including at least one sub-object, and wherein displaying in the navigation bar the display widget corresponding to the second object comprises:
      when the at least one sub-object is a plurality of folders, displaying, in the navigation bar, a respective display widget corresponding to each subordinate file and/or subordinate folder included in the plurality of folders included in the second object, and the plurality of folders are not displayed.

2. The method according to claim 1, wherein displaying in the navigation bar the display widget corresponding to the second object comprises:
   when the at least one sub-object is at least one file, displaying, in the navigation bar, a respective display widget corresponding to each of the at least one file.

3. The method according to claim 1, wherein displaying in the navigation bar the display widget corresponding to the second object comprises:
   when the at least one sub-object includes at least one file and at least one folder, displaying, in the navigation bar, a respective display widget corresponding to each of the at least one file or the at least one folder.

4. The method according to claim 1, wherein the second object includes at least two objects, wherein displaying in the navigation bar the display widget corresponding to the second object comprises:
   displaying an integration portal in the navigation bar;
   receiving a second signal that is generated based on a second specified operation that is triggered on the integration portal; and
   displaying in the navigation bar, based on the second signal, a respective display widget corresponding to each of the at least two objects.

5. The method according to claim 4, wherein displaying the integration portal in the navigation bar comprises:
   when the second object exists in the user interface, displaying the integration portal on the area of the navigation bar in addition to the n virtual buttons, the n virtual buttons comprising at least one of a return button, a home button, and a menu button,
   wherein displaying in the navigation bar, based on the second signal, the respective display widget corresponding to each of the at least two objects comprises:
      based on the second signal, replacing a display of a predetermined virtual button among the n virtual buttons with a display of the at least two display widgets.

6. The method according to claim 5, wherein the method further comprises:
   displaying a navigation menu key in the navigation bar;
   receiving a third signal that is generated based on a third specified operation that is triggered on the navigation menu key; and
   based on the third signal, resuming the display of the predetermined virtual button to replace the display of the at least two display widgets.

7. The method according to claim 1, wherein displaying in the navigation bar the display widget corresponding to the second object comprises:
   when the display widget comprises M widgets, determining N first display widgets and M-N second display widgets among the M widgets, wherein N is a preset positive integer and M is an integer greater than N;
   displaying the N first display widgets in the navigation bar; and
   when a fourth specified operation performed on the navigation bar is detected, replacing a display of Z display widgets among the N first display widgets with a display of Z display widgets among the M-N second display widgets, wherein Z is a positive integer and Z is not greater than a smaller one of N and M-N.

8. The method according to claim 1, wherein at least one of a thumbnail of the second object and thumbnail text information corresponding to the second object is displayed in the display widget.

9. The method according to claim 1, wherein the first specified operation performed on the display widget comprises:
a click operation or a long-time press operation on the display widget; or
moving the display widget to a specified position in the navigation bar.

10. An apparatus for displaying an object, comprising:
a processor;
a memory configured to store processor-executable instructions,
wherein the processor is configured to:
display a navigation bar and a user interface of an application program, wherein the navigation bar is configured to display widgets of n virtual buttons provided by an operating system, where n is a positive integer;
when a first object is displayed in the user interface, determine a second object corresponding to the first object, wherein the first object and the second object are a part of a superior-level object;
display in the navigation bar a display widget corresponding to the second object;
receive a first signal that is generated based on a first specified operation that is triggered on the display widget; and
switch a display of the first object in e user interface to a display of the second object,
wherein the second object is a folder containing at least one sub-object, and wherein when displaying in the navigation bar the display widget corresponding to the second object, the processor is further configured to:
when the at least one sub-object is a plurality of folders, display, in the navigation bar, a respective display widget corresponding to each subordinate file and/or subordinate folder included in each of the plurality of folders included in the second object, and the plurality of folders are not displayed.

11. The apparatus according to claim 10, wherein when displaying in the navigation bar the display widget corresponding to the second object, the processor is further configured to:
when the at least one sub-object is at least one file, display, in the navigation bar, a respective display widget corresponding to each of the at least one file; or
when the at least one sub-object includes at least one file and at least one folder, display, in the navigation bar, a respective display widget corresponding to each of the at least one file or the at least one folder.

12. The apparatus according to claim 10, wherein, the second object includes at least two objects, wherein when displaying in the navigation bar the display widget corresponding to the second object, processor is further configured to:
display an integration portal in the navigation bar;
receive a second signal that is generated based on a second specified operation that is triggered on the integration portal; and
display in the navigation bar, based on the second signal, a respective display widget corresponding to each of the at least two objects.

13. The apparatus according to claim 12, wherein when displaying the integration portal in the navigation bar, the processor is further configured to:
when the second object exists in the user interface, display the integration portal on the area of the navigation bar in addition to the n virtual buttons, the n virtual buttons comprising at least one of a return button, a home button, and a menu button,
wherein when displaying in the navigation bar, based on the second signal, the respective display widget corresponding to each of the at least two second objects, the processor is further configured to:
based on the second signal, replace a display of a predetermined virtual button among the n virtual buttons with a display of the at least two display widgets.

14. The apparatus according to claim 13, wherein the processor is further configured to:
display a navigation menu key in the navigation bar;
receive a third signal that is generated based on a third specified operation that is triggered on the navigation menu key; and
based on the third signal, resume the display of the predetermined virtual button to replace the display of the at least two display widgets.

15. The apparatus according to claim 10, wherein when displaying in the navigation bar the display widget corresponding to the second object, the processor is further configured to:
when the display widget comprises M widgets, determine N first display widgets and M-N second display widgets among the M widgets, wherein N is a preset positive integer and M is an integer greater than N;
display the N first display widgets in the navigation bar; and
when a fourth specified operation performed on the navigation bar is detected, replace a display of Z display widgets among the N first display widgets with a display of Z display widgets among the M-N second display widgets, wherein Z is a positive integer and Z is not greater than a smaller one of N and M-N.

16. The apparatus according to claim 10, wherein at least one of a thumbnail of the second object and thumbnail text information corresponding to the second object is displayed in the display widget.

17. The apparatus according to claim 10, wherein the first specified operation performed on the display widget comprises:
a click operation or a long-time press operation on the display widget; or
moving the display widget to a specified position in the navigation bar.

18. A non-transitory computer-readable medium storing instructions that, when executed by one or more processors of a computing device, cause the computing device to:
display a navigation bar and a user interface of an application program, wherein the navigation bar is configured to display widgets of n virtual buttons provided by an operating system, where n is a positive integer;
when a first object is displayed in the user interface, determine a second object corresponding to the first object, wherein the first object and the second object are a part of a superior-level object;
display in the navigation bar a display widget corresponding to the second object;
receive a first signal that is generated based on a first specified operation that is triggered on the display widget; and
switch a display of the first object in the user interface to a display of the second object,
wherein the second object is a folder containing al least one sub-object, and wherein when displaying in the navigation bar the display widget corresponding to the second object, the instructions further cause the computing device to:

when the at least one sub-object is a plurality of folders, display, in the navigation bar, a respective display widget corresponding to each subordinate file and/or subordinate folder included in each of the plurality of folders included in the second object, and the plurality of folders are not displayed.

\* \* \* \* \*